US008145120B2

(12) United States Patent
Vermola et al.

(10) Patent No.: US 8,145,120 B2
(45) Date of Patent: Mar. 27, 2012

(54) APPARATUS, SYSTEM, METHOD AND COMPUTER PROGRAM PRODUCT FOR SERVICE SELECTION AND SORTING

(75) Inventors: Larri Vermola, Turku (FI); Tero Naumi, Koski T1 (FI); Tuomo Saarikivi, Helsinki (FI); Karina Terekhova, Helsinki (FI); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/973,421

(22) Filed: Oct. 27, 2004

(65) Prior Publication Data

US 2005/0090235 A1 Apr. 28, 2005

Related U.S. Application Data

(60) Provisional application No. 60/517,111, filed on Nov. 5, 2003.

(30) Foreign Application Priority Data

Oct. 27, 2003 (GB) .................................. 0325041.2
Nov. 5, 2003 (GB) .................................. 0325846.4
Nov. 6, 2003 (GB) .................................. 0325962.9

(51) Int. Cl.
 *H04H 1/00* (2006.01)

(52) U.S. Cl. ........................ 455/3.01; 455/552.1; 725/39

(58) Field of Classification Search ........ 455/3.01–3.06, 455/1.06, 414.3, 552.1; 725/39, 56, 62; 370/310, 370/312, 328
See application file for complete search history.

(56) References Cited

U.S. PATENT DOCUMENTS

| | | | | |
|---|---|---|---|---|
| 5,589,892 A | * | 12/1996 | Knee et al. ...................... | 725/43 |
| 6,182,287 B1 | * | 1/2001 | Schneidewend et al. ....... | 725/48 |
| 6,725,022 B1 | * | 4/2004 | Clayton et al. ............. | 455/154.1 |
| 7,711,315 B2 | * | 5/2010 | Aaltonen et al. ............. | 455/3.02 |

(Continued)

FOREIGN PATENT DOCUMENTS

CN 1339222 A 3/2002

(Continued)

OTHER PUBLICATIONS

Chinese Office action of corresponding CN App. No. 200480031549.1 dated Feb. 5, 2010, pp. 1-17.

(Continued)

*Primary Examiner* — Nay A Maung
*Assistant Examiner* — Angelica Perez
(74) *Attorney, Agent, or Firm* — Ditthavong Mori & Steiner, P.C.

(57) ABSTRACT

An apparatus, system, method and computer program product for providing a user of a terminal with broadcast services. A terminal controller is configured to use data forming the whole of or part of an electronic service guide, and store information concerning the accessibility of services. That information is used to then generate a list of selectable services available to the user. A user interface presents at least part of the list in a selectable manner. Service accessibility display options are included either as a setting in the terminal or as a user input. Subscribed services are presented to the user on a display differently than non-subscribed services. If a non-subscribed service is selected, payment data is retrieved from the terminal and a suitable subscription is purchased without significant user involvement. The purchase of a subscription results in the terminal receiving subscription data, which is then stored for future use.

14 Claims, 13 Drawing Sheets

U.S. PATENT DOCUMENTS

| | | | |
|---|---|---|---|
| 2002/0025777 A1* | 2/2002 | Kawamata et al. | 455/3.05 |
| 2002/0032908 A1* | 3/2002 | Booth | 725/86 |
| 2002/0073245 A1* | 6/2002 | Hallford | 709/331 |
| 2002/0132575 A1* | 9/2002 | Kesling et al. | 455/2.01 |
| 2002/0137496 A1* | 9/2002 | Nagaoka et al. | 455/414 |
| 2002/0151327 A1* | 10/2002 | Levitt | 455/556 |
| 2003/0032389 A1* | 2/2003 | Kim et al. | 455/3.01 |
| 2003/0166392 A1 | 9/2003 | Laiho et al. | |
| 2004/0203630 A1* | 10/2004 | Wang | 455/414.1 |
| 2005/0037706 A1* | 2/2005 | Settle | 455/12.1 |
| 2007/0072542 A1* | 3/2007 | Haagen | 455/3.06 |

FOREIGN PATENT DOCUMENTS

| | | |
|---|---|---|
| EP | 1 298 836 | 4/2003 |
| WO | 00/64177 | 10/2000 |
| WO | 02/03728 | 1/2002 |

OTHER PUBLICATIONS

Chinese Office action of corresponding CN App. No. 200480031549.1 dated Mar. 17, 2011, pp. 1-7.
ETSI: "Digital Video Broadcasting (DVB); Specification for Service Information (SI) in DVB Systems" ETS 300 468, Jan. 31, 1997, pp. 1-72, XP002505329.
European Search Report for EP 04 79 4208 dated Dec. 9, 2008.
European Office action of corresponding EP App. No. 04 794 208.1, May 24, 2011, pp. 1-6.
Chinese Office action of corresponding CN App. No. 200480031549.1 dated Oct. 25, 2010, pp. 1-9.

* cited by examiner

| Channel Title | Category | Voucher | Program Type | Other Database Values |
|---|---|---|---|---|
| RTL 1 | GeneralTV | Valid | Undefined | Other Database Values |
| RTL2 | GeneralTV | Valid | Undefined | Other Database Values |
| SportsNews | Sports | Valid | Sports | Other Database Values |
| Supersport 1 | Sports | Not Available | Sports | Other Database Values |
| HotTV2000 | CU | Valid | Adult | Other Database Values |
| MusicDown Loader | Downloads | Not Available | Music | Other Database Values |

Fig. 10

| Channel Title | Category | Voucher | Program Type | Bundle |
|---|---|---|---|---|
| RTL 1 | 11:00.00 | Valid | Undefined | Basic |
| RTL2 | 11:00.00 | Valid | Undefined | Basic |
| SportsNews | 11:10.00 | Valid | Sports | Basic |
| Supersports 1 | 11:10.00 | Not Available | Sports | Plus |
| HotTV2000 | 11:20.00 | Valid | Adult | Basic |
| MusicDown Loader | 11:20.00 | Not Available | Music | None |

Fig. 11

APPARATUS, SYSTEM, METHOD AND COMPUTER PROGRAM PRODUCT FOR SERVICE SELECTION AND SORTING

RELATED PATENT APPLICATIONS

This application claims priority from U.S. provisional application No. 60/517,111 entitled, "SERVICE SELECTION AND SORTING" filed on Nov. 5, 2003, as well as foreign priority from GB application No. 0325041.2 filed on Oct. 27, 2003, GB application No. 0325846.4 filed on Nov. 5, 2003, and GB application No. 0325962.9 filed on Nov. 6, 2003, which are all incorporated herein by reference.

FIELD OF THE INVENTION

The invention relates generally to a terminal with a user interface used for receiving broadcast services, wherein the terminal receives the broadcast services and the user interface presents the broadcast services in a selectable manner.

BACKGROUND OF THE INVENTION

One well-known digital mobile radio system is the Global System For Mobile Communication (GSM). In cellular radio networks like the GSM, a Home Location Register (HLR) stores location and subscriber data for mobile radios registered in the network. When a person subscribes to receive a service from a cellular network operator, the subscription is entered into the HLR of that operator. The location information of moving mobile communications units is periodically updated in the HLR. In addition to the HLR, Visiting Location Registers (VLRs) temporarily store and retrieve location and subscription information for visiting mobile subscribers. Various information (sometimes in considerable amounts) is passed between the HLR and the VLRs, e.g., subscriber's service subscriptions when mobile subscribers are roaming either in a home network or in a visited network.

It is expected that subscription services commonly found with existing satellite and cable television providers will be used with digital broadcasts such as Digital Video Broadcasting (DVB), Advanced Television Systems Committee (ATSC) or Integrated Services Digital Broadcasting (ISDB). However, such subscription services can be fairly complicated to manage. For example, a basic package of channels (as they are called in conventional television services) or services (as they are called in DVB-T) could be without charge, or could be included in a basic subscription. That basic package could also be supplemented with additional services, either singularly or in bundles of services that can be purchased on a pay-per-view basis.

To add to the complication of the subscriptions services, subscriptions typically have a definite duration, or a fixed end time. Therefore, to prevent non-subscribers from receiving a subscription service, it is common to encrypt the services. Subscribers are provided with a key or keys that allow them to decrypt the service for consumption. To allow subscriptions to have a limited duration, the keys are changed at suitable intervals Additionally, when new services or new subscribers are introduced into a mobile communications system, those new services and/or subscribers are defined in the HLR, and thereafter, the HLR must update the VLRs with the new service and/or subscriber information. Typically, new services are added to the HLR and updated in VLRs. Other types of registers may be used for managing and administrating subscribers. However, the subscriber identification modules (SIMs) used by some mobile devices are typically different for all the operators.

Because all mobile devices agree to get services through an operator, i.e. they are registered users of the operator network/service, there is a need to provide a variety of services to mobile device users. There is a further need to provide the same kind of services offered by operators, but independent of operators. Therefore, it is necessary to provide the users of mobile devices easy and efficient access to content that is broadcast in a network.

SUMMARY OF THE INVENTION

According to an embodiment, there is provided a terminal for receiving broadcast services. The terminal includes a controller configured to use data forming the whole of or part of an electronic service guide, and store information concerning the accessibility of services. That information is used to then generate a list of selectable services available to the user. A user interface presents at least part of the list in a selectable manner. It is contemplated that the controller is operable to generate the list of individual selectable services and/or to generate a list of selectable bundles, wherein each bundle includes two or more services.

The user interface is controllable in response to a setting or input to present services along with corresponding access information. To provide a convenient user interface, the controller can be operable via a setting or a user input to generate a list of services that are currently accessible. Alternatively, the controller can be operable via a setting or a user input to present services that are currently accessible differently than those that are not currently accessible. For example, accessible services may be shown with a different color foreground or background, "greyed-out," in a different font, or with different icons.

Advantageously, the controller is responsive to a user input for selecting an inaccessible service by commencing a service purchase procedure, which can be carried out in an easy and efficient manner. For increased convenience, the controller can be configured to determine which service bundles include the selected inaccessible service, and the user interface can be configured to present those service bundles in a selectable manner.

To avoid a user from having to input payment data every time that a service or bundle is purchased, the controller is preferably configured to implement a service purchase procedure by sending pre-existing payment data, maintained locally in the terminal, via a communications link. It is contemplated that the terminal includes a receiver operable to receive service purchase information over a bidirectional communications link. The received service purchase information can include one or more time-slicing parameters and/or data required to access the respective service or services. The access data can include schedules, keys or other such data that the terminal uses to receive the corresponding service, services or bundle of services. Additionally, the received service purchase information preferably includes one or more decryption keys, that allows the service(s) to be accessed easily. The terminal can be configured to update the locally stored information concerning the accessibility of services with the received service purchase information, or at least part of the received information.

According to another embodiment, there is provided a method of operating a terminal for receiving broadcast services. The method includes receiving data forming the whole of or part of an electronic service guide and locally maintaining information concerning the accessibility of services. The electronic service guide data and the accessibility data are then used to generate a list of selectable services. At least part of the list is then presented in a selectable manner.

According to another embodiment, there is provided a user interface for presenting broadcast services. The user interface includes a list generator configured to use data forming the whole of or part of an electronic service guide and information concerning the accessibility of services. That data and information is then used to generate a list of selectable services. The user interface also includes a means configured to present at least part of the list in a selectable manner.

According to another embodiment, a datacast operator sends a broadcast to take into account all mobile phone users independently from the operator from which they are served. It is contemplated that substantially all bundles for sale are introduced to every operator's sales channel. It is also contemplated that the electronic service guide includes a purchase channel and there is a link between the purchase channel and a bundle.

BRIEF DESCRIPTION OF THE DRAWINGS

In the drawings, like reference numbers generally indicate identical, functionally similar, and/or structurally similar elements. The present invention will be described with reference to the accompanying drawings, wherein:

FIG. 10 is a table that illustrates in more detail an example of the services available to a user using a broadcast network in accordance with an embodiment.

FIG. 11 is a table that illustrates in more detail an example of the services available to a user using a broadcast network in accordance with an embodiment.

DETAILED DESCRIPTION OF THE DRAWINGS

Figure 1:
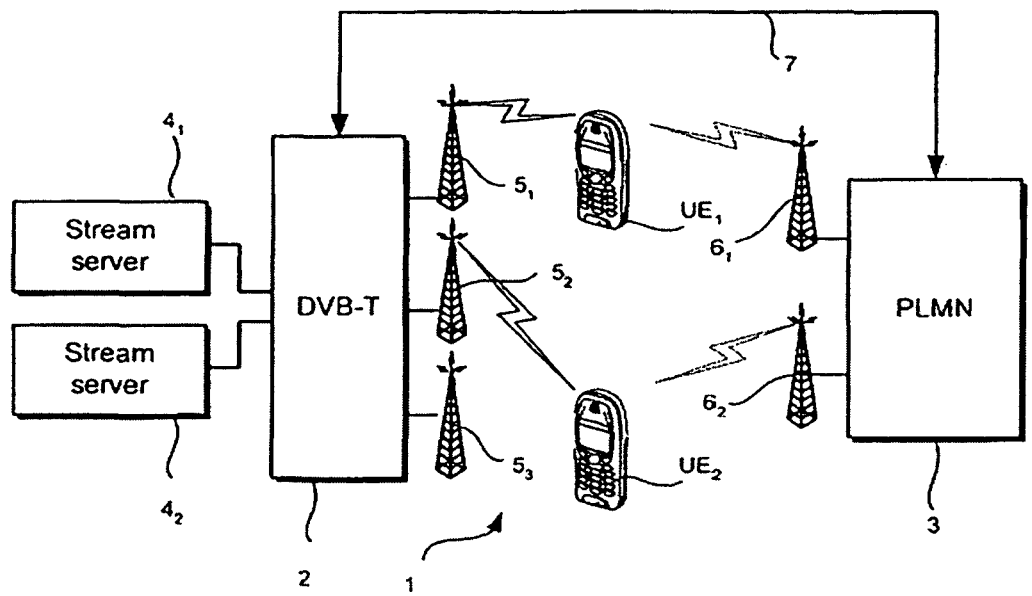
FIG. 1 is a schematic diagram of an exemplary mobile communication system including a broadcast network and a public land mobile telecommunications network (PLMN) according to an embodiment.

FIG. 1 is a schematic diagram of an exemplary mobile communication system including a broadcast network and a public land mobile telecommunications network (PLMN) according to an embodiment. FIG. 1 illustrates a communication system 1 in which mobile user equipment in the form of mobile telephone handsets $UE_1$, $UE_2$ are configured to receive transmissions from a broadcast network, such as DVB-T type network 2 or an enhancement of that type of network, and also to communicate through a public land mobile network (PLMN) 3. The DVB-T type network 2 transmits content such as audiovisual content, data files or images to the handsets $UE_1$, $UE_2$. The content is obtained from data stream servers $4_1$, $4_2$ through Internet protocol (IP) so that the network can provide an IP data casting (IPDC) service using the DVB-T type network 2. Two such servers $4_1$, $4_2$ are shown by way of example although in practice there may be many more. The DVB-T type network 2 is cellular and antennas $5_1$, $5_2$ and $5_3$ serve individual cells of the network at geographically spaced sites.

The PLMN 3 may comprise any suitable mobile telephone network, such as 2 G, 2.5 G or 3 G network, with antennas $6_1$ and $6_2$ that serve individual cells of the PLMN. A communication channel 7 may be provided between the DVB-T type network 2 and the PLMN 3 to allow bi-directional communication between the networks 2, 3, e.g. for the interchange of service information.

Figure 2:
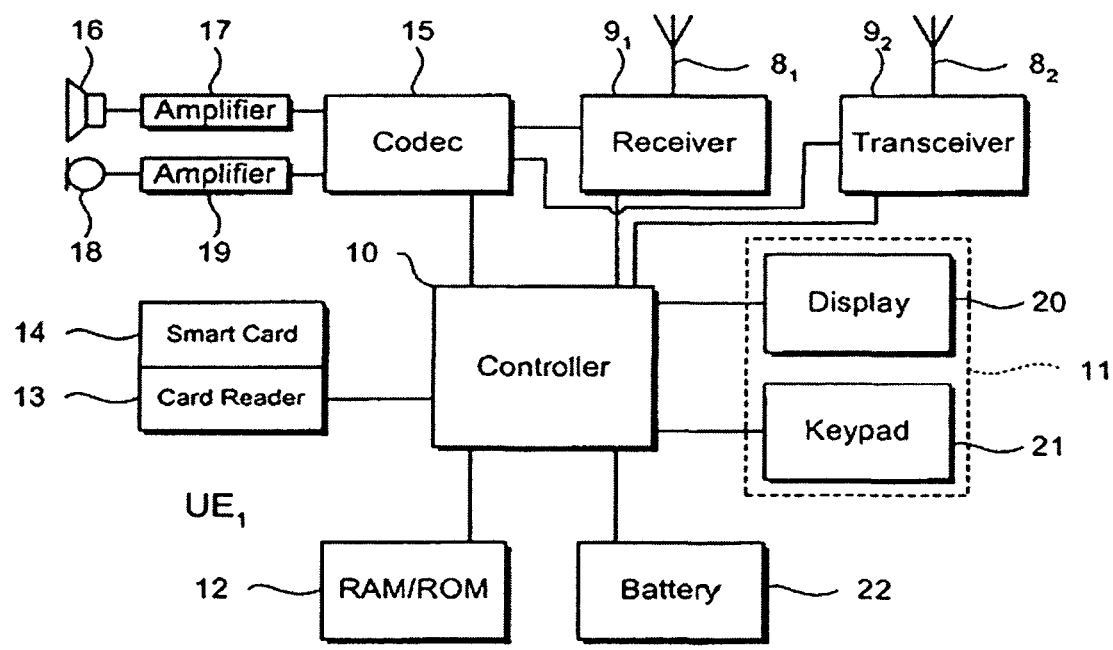
FIG. 2 is a schematic diagram of exemplary circuits for a mobile telephone handset configured to receive broadcast transmissions according to an embodiment.

FIG. 2 is a schematic diagram of exemplary circuits for a mobile telephone handset configured to receive broadcast transmissions according to an embodiment. More specifically, FIG. 2 illustrates the circuits for the mobile handset $UE_1$ by way of a simplified example. Handset $UE_2$ is of a substantially similar configuration. The handset $UE_1$ includes first and second antennas $8_1$, $8_2$, a receiver $9_1$ and a transceiver $9_2$. The first antenna $8_1$ and receiver $9_1$ are configured to receive signals from the DVB-T type network 2. The second antenna $8_2$ and transceiver $9_2$ are used to transmit and receive signals to and from the PLMN 3. The receiver and transceiver $9_1$, $9_2$ each include respective RF signal processing circuits (not shown) for amplifying and demodulating received signals and respective processors (not shown) for channel de-coding and de-multiplexing.

The handset $UE_1$ also includes a controller 10, a user interface 11, memory 12, a smart card reader 13, smart card 14 received in the smart card reader 13, a coder/decoder (codec)

15, a speaker 16 with corresponding amplifier 17 and microphone 18 with corresponding preamplifier 19. The user interface 11 comprises a display 20 and keypad 21. The display 20 is configured to display images and video by, for example, being larger and/or having greater resolution than the display of many conventional mobile telephone handsets and being capable of displaying color images. The device also includes a rechargeable battery 22. The controller 10 manages operation of the handset under the direction of computer software stored in memory 12. For example, the controller 10 provides an output for the display 20 and receives inputs from the keypad 21.

Figure 3:
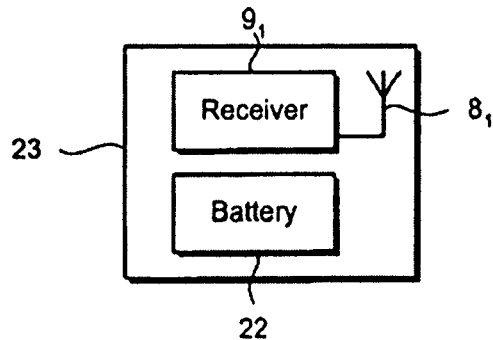
FIG. 3 a schematic diagram of an exemplary battery pack for mobile telephone handset illustrated in FIG. 2.

FIG. 3 a schematic diagram of an exemplary battery pack for the mobile telephone handset illustrated in FIG. 2. Referring to FIG. 3, the battery 22, the first antenna $8_1$ and the receiver $9_1$ may be incorporated into a battery pack 23. A conventional mobile telephone handset may be configured to receive data via the DVB-T type network 2 by replacing a conventional battery pack (not shown) with battery pack 23, which includes the receiver $9_1$ and providing software for enabling communication between interfaces in the battery pack 23 and handset. Alternatively, the first antenna $8_1$ and the receiver $9_1$ may be incorporated into a cover (not shown) for a conventional mobile telephone handset so that by replacing the cover and necessary software for the handset, the conventional handset can be upgraded or modified to receive transmissions from the DVB-T type network 2.

The handset $UE_1$ can receive DVB-T type transmissions through receiver $9_1$ from the DVB-T type network 2. The received signal is amplified, demodulated, channel de-coded and demultiplexed. The resulting demultiplexed signal (not shown) is filtered so as to extract bursts of datagrams. Datagram bursts are fed into a time-slice buffer which is provided by the controller 10 and memory 12 so as to produce a stream of datagrams which are not time-sliced. In one embodiment of invention, the datagram stream is substantially continuous and/or transmitted at a substantially constant rate. The resulting data stream is then displayed on display 20 with respect to video and other visually displayable signals. Audio signals are passed through codec 15 and amplifier 17 to speaker 16.

The transceiver $9_2$ is for use with PLMN 3 and uses a conventional mobile telecommunications protocol to achieve bidirectional voice and data communication under the control of controller 10, with displays being provided on display 20 and audio being handled by means of speaker 16 and microphone 18. While the device $UE_1$ has been described in terms of a mobile telephone handset, it may also includes a personal digital assistant PDA or other mobile terminal capable of at least receiving signals from the DVB-T type network 2. An example of such a device is the Nokia 7700 phone as described at http://www.nokia.com. The device $UE_1$ may also be semi-fixed or semi-portable such as terminal in a vehicle.

Figure 4:
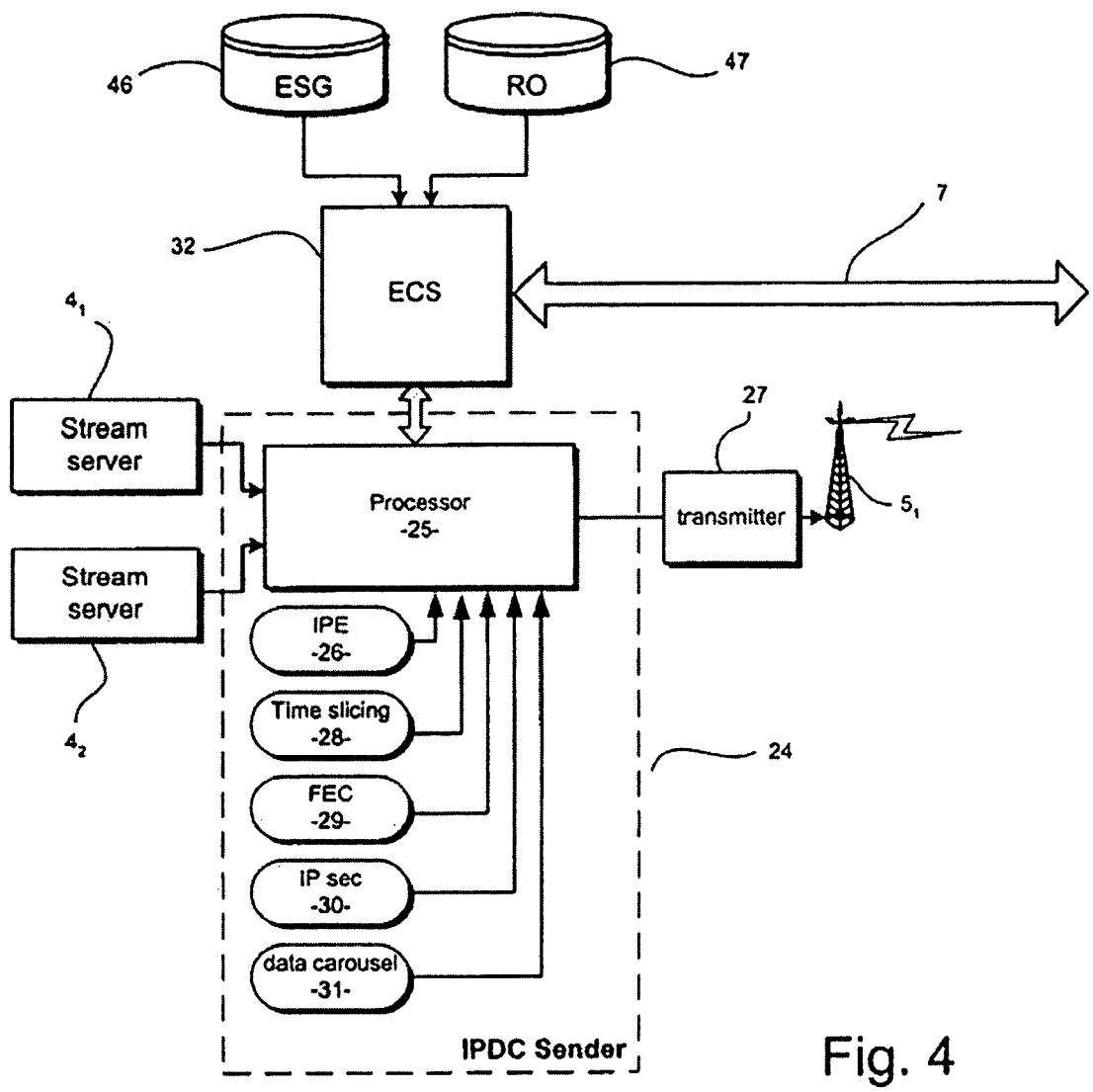
FIG. 4 is a more detailed schematic diagram of an exemplary broadcast network that includes an e-commerce system according to an embodiment.

FIG. 4 is a more detailed schematic diagram of an exemplary broadcast network that includes an e-commerce system according to an embodiment. FIG. 4 illustrates an exemplary DVB-T type network 2. The stream servers $4_1$, $4_2$ supply content in the form of IP datagrams to an Internet Protocol Datacast (IPDC) sender 24. The IPDC sender 24 includes a main processor 25, which receives IP datagrams from the data stream content servers $4_1$, $4_2$. The main processor 25 runs a number of processes associated with multi-protocol encapsulation of the IP data.

IP encapsulation process 26, run by the processor 25, embeds the IP packets into multi-protocol encapsulation (MPE) sections that are incorporated into MPEG-2 transport stream (TS) packets. For further details, reference is directed to ETSI EN 301 192 V1.3.1 (2003-01) "Digital Video Broadcasting (DVB) DVB specification for data broadcasting" Section 7. Briefly, the IP packets belonging to the same stream, possibly from several IP sessions, are configured for inclusion in the TS stream as an elementary stream (ES). That is achieved by placing the IP datagrams in MPE sections and placing the sections into packets of the TS for broadcast by transmitter 27, through antenna $5_1$.

The main processor 25 also performs time-slicing, which is used to reduce the time that the receiver $9_1$ needs to be switched on to receive data thereby saving its battery power. The main processor 25 carries out a time-slicing process 28 in which the MPE sections are configured in time spaced bursts in the TS together with time-slicing information which indicates when the receiver should be switched off and when to turn it on again, in order to receive the service while minimizing power consumption in the receiver circuitry.

Also, a forward error correction (FEC) process 29 may be carried out in order to create packets of data containing forward error correction codes (FECs) to be incorporated into the TS. The advantage of implementing FEC in the IPDC transmissions from IPDC sender 24 lies in the fact that the transmission over the air is particularly error-prone, when compared to transmission in wired networks. There are two main reasons for that. Firstly, signal-to-noise ratios in radio transmission are not as good as in wire-based transmission media and can have considerable fluctuations. Furthermore, due to the unidirectional nature of the DVB-T type network 2, it is not possible to use protocols, such as the Transmission Control Protocol (TCP), that request re-transmission of lost packets.

The main processor 25 also performs security function processes 30 to allow IP encryption and authentication codes to be processed, such as IPSec according to Internet Engineering Task Force (IETF) RFC 2401. Such codes can be used to check the integrity of IP datagrams received from the stream servers $4_1$, $4_2$. The codes are included in the encapsulated data in the TS as part of a security key scheme that enables only authorized UEs to receive the broadcast data successfully. The main processor 25 also controls a data carousel 31, which controls transmission of rights objects to UEs, as will be described later. An e-commerce system 32, hereafter referred to as an ECS, is provided for handling registrations and subscriptions to a service associated with the content.

Figure 5:
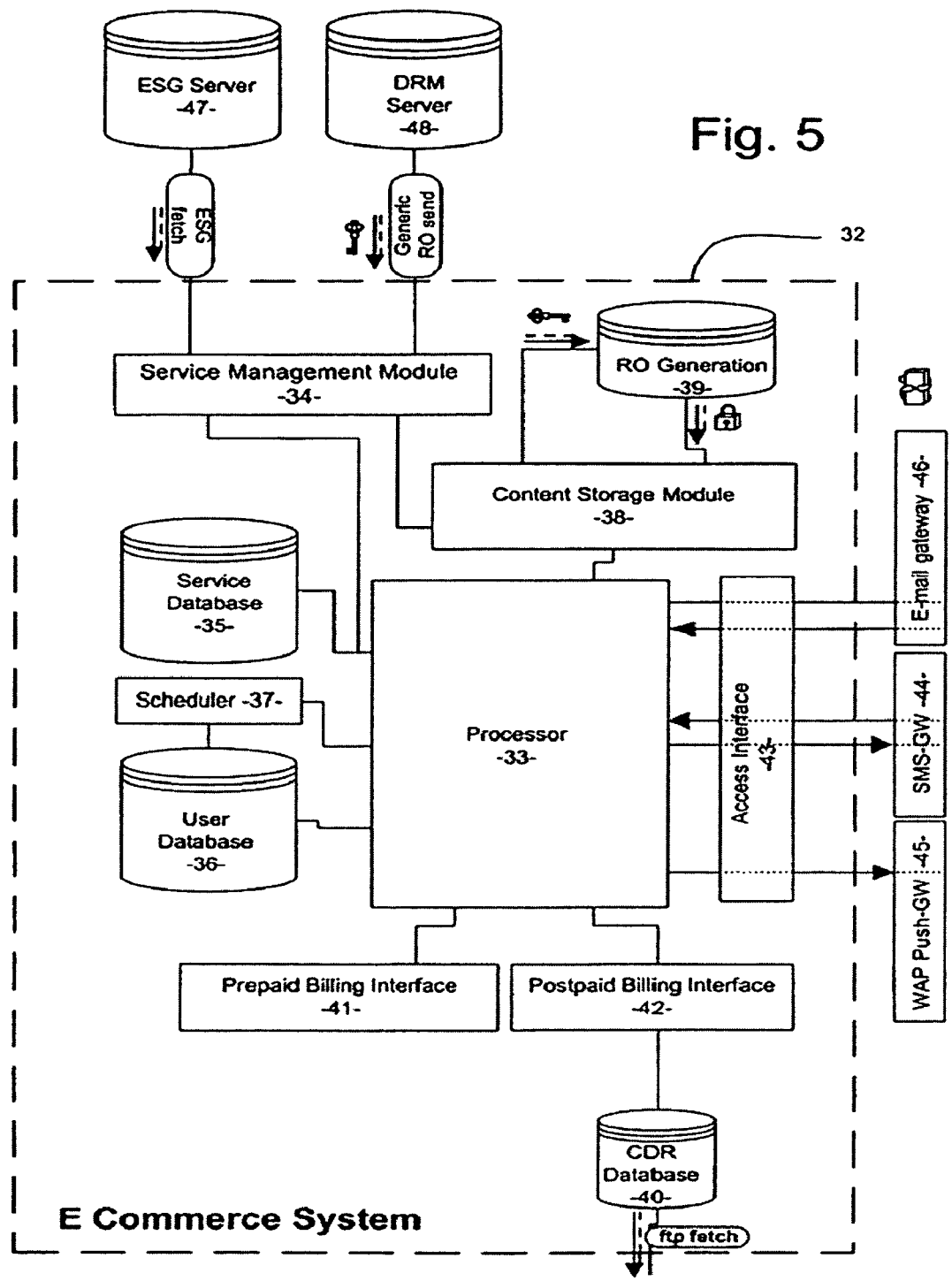
FIG. 5 is a more detailed schematic diagram of the e-commerce system illustrated in FIG. 4.

FIG. 5 is a more detailed schematic diagram of the e-commerce system illustrated in FIG. 4. In FIG. 5, the ECS 32 includes a processor 33, a service management module 34, a service database 35, a user database 36, a scheduler 37, a content storage module 38, a rights object (RO) generation module 39, a Charging Detail Record (CDR) database 40, together with billing interfaces 41, 42 and an access interface 43. The ECS 32 is configured to communicate via the PLMN 3, for example, in order to receive subscription or registration requests from the UEs via an interaction channel, or to forward billing and/or payment information to an operator of the PLMN 3.

In one embodiment, the ECS 32 can receive requests for content and send response messages through the PLMN 3 via a Short Message Service (SMS) gateway 44. A Wireless Application Protocol (WAP) Gateway 45 is also provided in one embodiment to allow data to be sent from the ECS 32 to a UE, via the PLMN 3. A gateway 46 for handling e-mail communications may be provided. The processor 33 may, in one embodiment, be configured to send and receive HyperText Transfer Protocol (HTTP) data, in which case the access interface 43 converts incoming data into HTTP and outgoing data into a suitable format for transmission as an e-mail, a SMS message and/or using WAP or another wireless protocol.

In one embodiment, the ECS 32 is configured to receive electronic service guide (ESG) data from an external ESG server 47. The ECS 32 may receive ESG data from one or more network operators or service providers, wherein the respective sources of the different ESGs can be identified. The ESG may comprise a list of available services, identifiers used for denoting the services, pricing information and a transmission schedule relating to those services, including information identifying the channel on which the services are to be provided. In one embodiment, part or all of the ESG, or media guide, are sent at predefined intervals.

The ESG is generated and updated periodically and may include information on the last update, modification date/time and/or information on its validity period, such as an indication of when the ESG is due to be updated. When an ESG is generated or updated, it is broadcast over the DVB-T type network 2 and also sent to the ECS 32. The service management module 34 then extracts information relating to the services, such as the service identifier and pricing information, and stores these in a service database 35.

The user database 36 stores information relating to subscriptions to services from the handsets $UE_1$, $UE_2$. Typically, the information will include a UE identifier for uniquely identifying a handset $UE_1$, $UE_2$, such as an International Mobile Equipment Identity (IMEI) or Mobile Subscriber Integrated Services Digital Network (MSISDN) number, together with the service identifier, information relating to the price paid by a user of the handset $UE_1$, $UE_2$ for that service and the time and date at which the subscription is to start and end. The user database 36 may also include other types of information, such as fingerprints, other biometric identification and/or user images for identifying the user in addition to, or instead of, the UE identifier.

In one embodiment, the ECS 32 may also receive data from an external Digital Rights Management (DRM) server 48. The DRM server 48 is configured to generate rights objects (ROs) for use in encrypting the content and/or restricting the use of that content when received at a handset $UE_1$, $UE_2$. For example, a RO associated with particular content may be defined so that a user of the handset $UE_1$ can view the content a limited number of times or during a limited period. A RO may also prevent forwarding of the received content to another handset $UE_2$.

The processor 33 generates billing information in the form of a CDR. Where a handset $UE_1$, $UE_2$ is operated under a postpaid subscription agreement, the CDR is sent via interface 42 for storage in the CDR database 40. The CDRs saved in the CDR database 40 can then be forwarded to a Home Location Register (HLR) of the PLMN 3. Where a handset $UE_1$, $UE_2$ is operated under a prepaid billing arrangement, the billing information is dealt with using a different mechanism. In that case, the processor 33 may send CDRs via interface 41 for storage in a separate database, not shown, where the data is compared against credit units available in that account.

Figure 6:
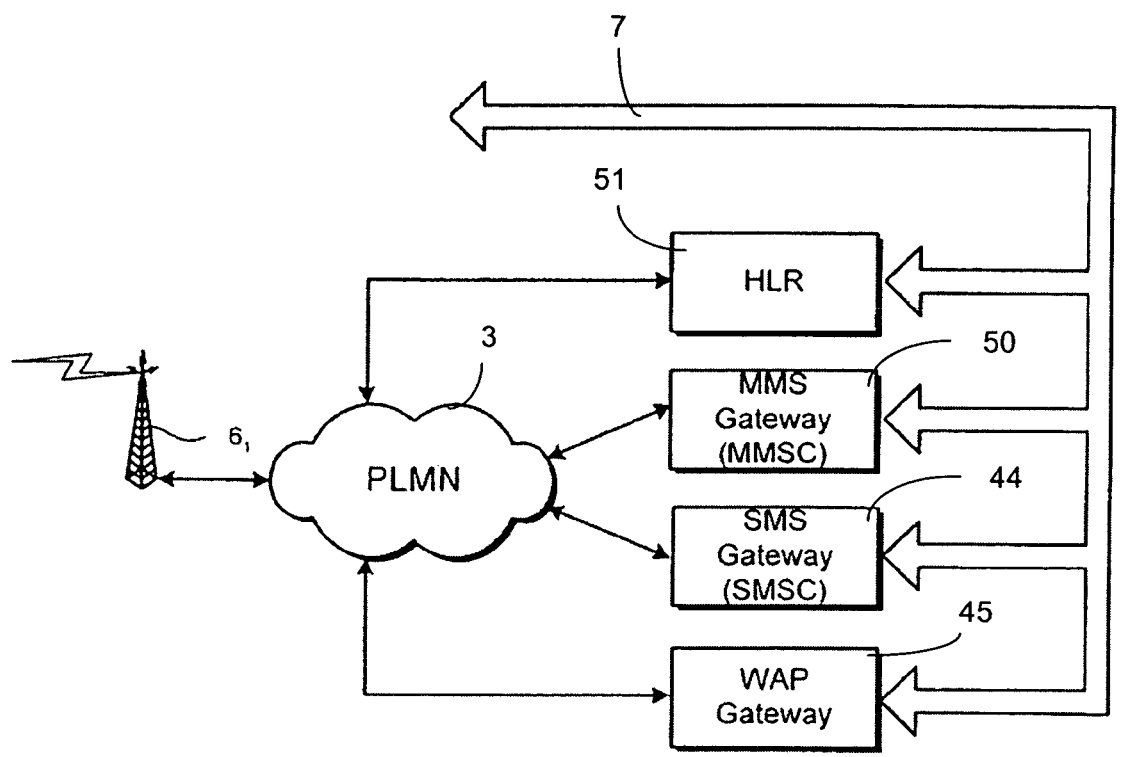
FIG. 6 is a more detailed schematic diagram of an exemplary PLMN in accordance with an embodiment.

FIG. 6 is a more detailed schematic diagram of an exemplary PLMN in accordance with an embodiment. In FIG. 6, the PLMN 3 includes a Multimedia Messaging Service Center (MMSC) 50 and a Short Message Service Center (SMSC) 44, for handling MMS and SMS messages sent by, or directed to, the handsets $UE_1$, $UE_2$, along with a Wireless Application Protocol (WAP) gateway 45. HLR 51 administrates and manages a database of information relating to the PLMN 3, subscribers and devices $UE_1$, $UE_2$ connected to the PLMN 3 and subscribers to the PLMN 3. The MMSC 50, SMSC 44, WAP gateway 45 and HLR 51 can communicate with the ECS 32 through the communication link 7.

Figure 7:
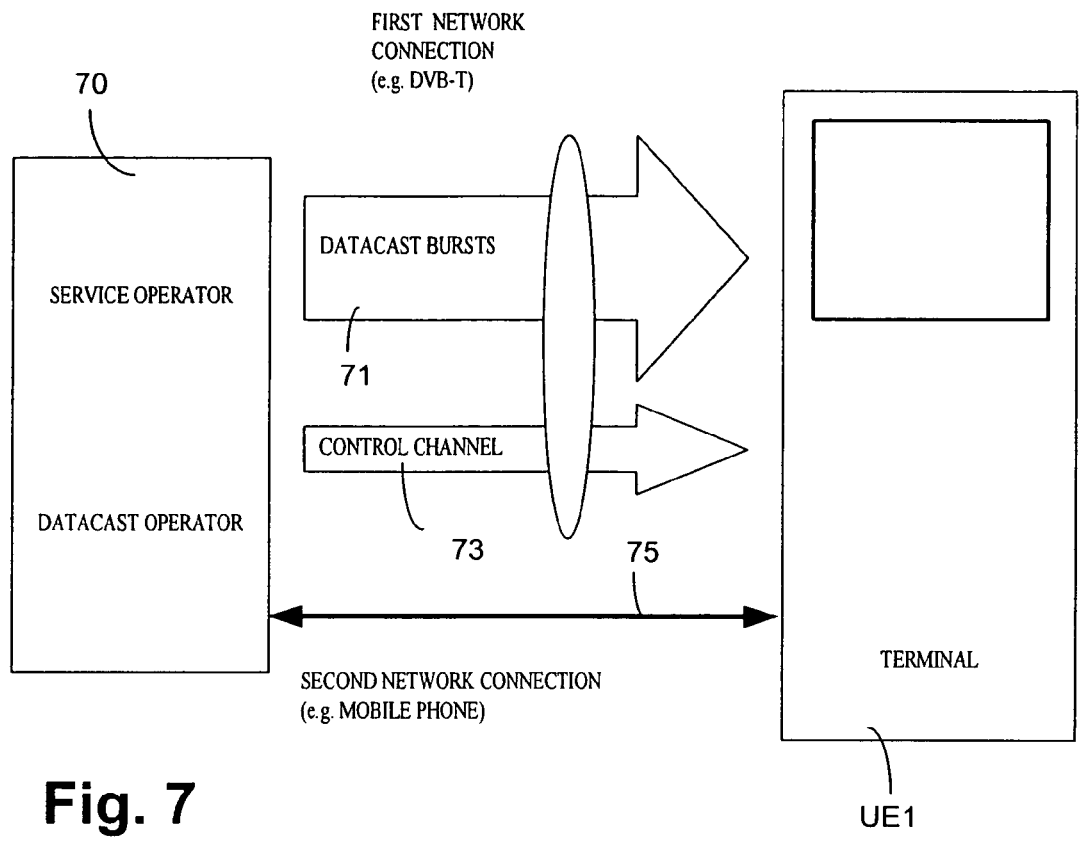
FIG. 7 is a schematic diagram illustrating an exemplary network for receiving broadcast services in accordance with an embodiment.

FIG. 7 is a schematic diagram illustrating an exemplary network for receiving broadcast services in accordance with an embodiment. In FIG. 7, it is contemplated that the mobile terminal $UE_1$ is provided with means for receiving broadband transmissions such as e.g. DVB-T, ATSC, ISDB. Those broadband transmissions may include a time-sliced datacast transmissions. The service provider or operator 70 provides a user with services via a data broadcast burst 71, which may include a bundle of service sets. One time-sliced burst may include one or more data packets and one data packet in the burst may comprise a service or a part thereof. Broadcast services or service sets may be sent to the terminal by using another communications network 75 e.g. a mobile phone network especially if the terminal $UE_1$ is provided with access to such a network. To that end, the terminal includes the necessary means for communicating via the second network. Additionally, communications from the terminal can be achieved via access through a short-range wireless communication or through wired connection to a device capable of communicating with the second network.

Each service set is associated with identifying data including an identifier unique to the service set. The identifying data also includes a number of different type metadata items both for the service set and for the services included in the service set. The identifier and the metadata are preferably transmitted in a table format in the transport stream. The table can be similar to the tables used in DVB-T, such as for example the bouquet association table (BAT) of the standard ETSI EN 300 468 (the '468 standard). The identifier and metadata items are preferably presented as descriptors like those defined in the '468 standard.

One multicast service system may bundle services from one or more service operators into one or more service sets. These services may comprise live content and/or stored content, and can have one of a number of different media formats. A service typically is an audio or video stream, teletext carousel, a set of web links etc. One service can include of one or more consecutive programs, similarly to conventional television and radio programs. A multicast service system may forward the bundled service set to one or more multicast operators, which can then transmit the forwarded service sets as multicasts to receivers in IP (Internet Protocol) datacasting bursts. A user can have subscriptions with plural multicast operators.

The terminal $UE_1$ also receives Service Information (SI) including time-slicing related information such as, e.g., burst sizes, maximum burst duration, which IP streams are included in particular time-slice channels, etc. Also the terminal receives in SI information from where IP based service can be found from network such as, e.g., carrier frequencies, used Packet IDentifiers (PID), transport_stream identifiers, etc. Real-time parameters relating to time-slicing are carried in section headers of the sections within the bursts. These real-time parameters include delta-T parameter, i.e. time when next burst from current time-slice channel can be assumed to be received after current section, end of the burst marker, etc.

The data items associated with and describing the service set, the services and the service components include Electronic Service Guide (ESG) data. The ESG data is used to provide a user of a terminal with the ability to select the channels, services and items he/she is interested in, and to find items stored on the terminal. An ESG data presents the service portfolio in a usable way, normally through a service hierarchy The terminal $UE_1$ receives ESG information, which describes the available service sets and/or services, their providers, their classifications such as ,e.g., genre, or other details such as relating to ordering and/or payment. The ESG information also includes schedules of the available services including transmitting times, frequencies, etc. for the time-sliced bursts. The ESG data can be transmitted as part of the time-sliced datacast service transmissions 71 or the ESG data can be transmitted using a dedicated control channel 73 (e.g. DVB-T). The ESG data can also be transmitted in data packets to the terminal $UE_1$.

Figure 8:
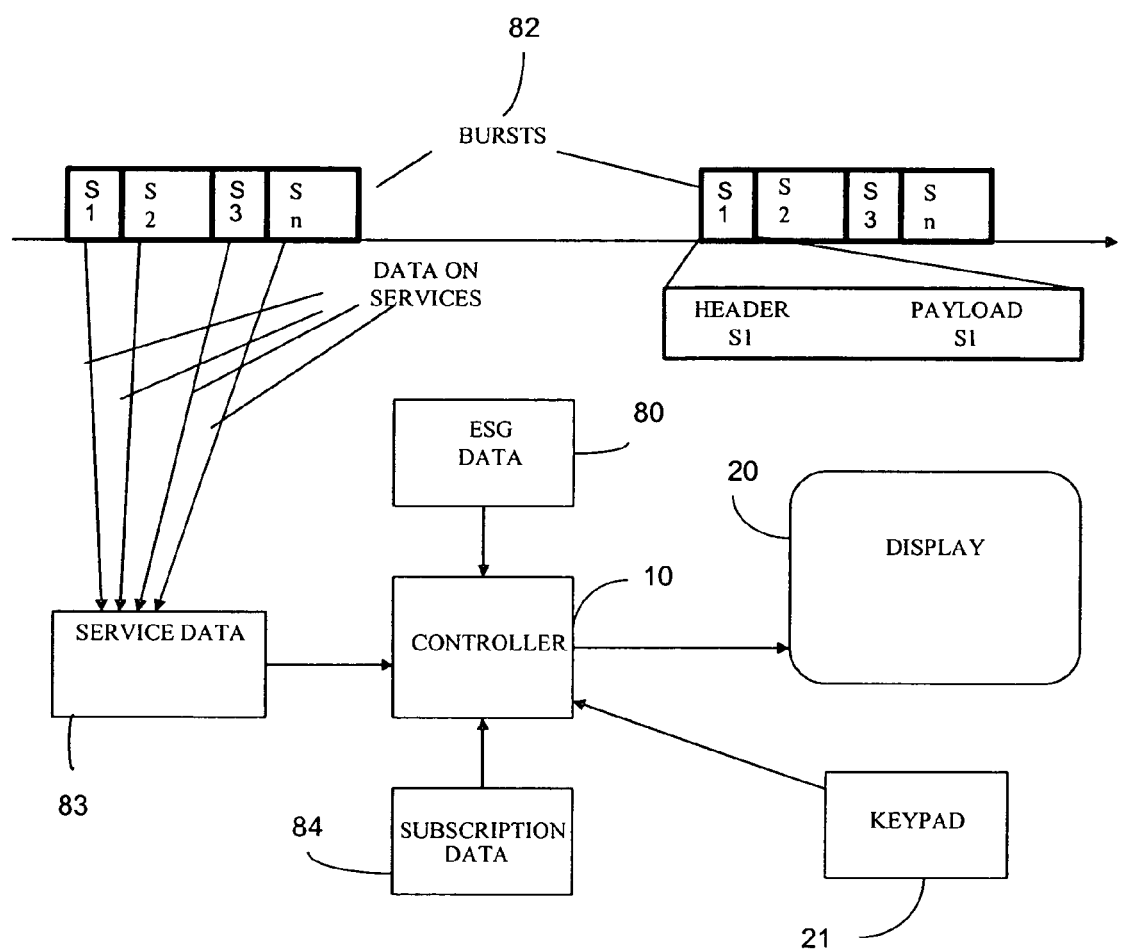
FIG. 8 is a schematic diagram illustrating an example of how service components are transmitted on a channel using time-slicing and presented to a user in accordance with an embodiment.

FIG. 8 is a schematic diagram illustrating an example how service components are transmitted on a channel using time-slicing and presented to a user in accordance with an embodiment. In FIG. 8, datacast bursts 82 used to transmit service components (S1, S2, . . . SN) are transmitted to the terminal $UE_1$ over, for example, a DVB-T network. The datacast burst is a time-sliced burst that includes one or more data packets each having a header part and a payload part. One data packet in the burst may comprise a service or a part thereof. The ESG data is received by the controller 10 and stored in a database 80 in the terminal where it can be updated. The schedule for the ESG data may be transmitted as part of the ESG data and stored in the terminal. The ESG data is preferably in a table format substantially similar to the standard ETSI EN 300 468 (the '468 standard) using similar descriptors. The table format of the ESG data will be illustrated in more detail in FIGS. 10 and 11.

The received ESG data may be used for turning the terminal on and off in order to save batteries. The user may select when the terminal is turned on for receiving the ESG data. The ESG data may not change very often and therefore it is not necessary to receive all the ESG transmissions. The terminal may be notified on changes in the ESG data by using a second network and these notifications may be used for controlling the terminal for the ESG data. From the received time-sliced datacast transmissions (bursts) the receiver can also extract and store information relating to the transmitted services in a memory location 83, which may include data items relating to ESG. The terminal also stores in a memory location 84 information relating to subscribed services including the duration and scope of the subscription, etc. That information may be received through a second network or it may be inputted by the user.

All the received service data is combined and shown to the user in a display 20 in a manner chosen by the user. The user may be shown e.g. the name of the service set or service, the transmitting time of the burst containing the said service set or service, the existence of a subscription to said service set or service, the genre or other classification of said service set or service, etc. The user can make a selection of services via a user interface such as a keypad 21 or the like. The user may select only the subscribed service sets or services, free service sets or all available service sets or services.

The service sets or parts thereof or individual services that need to be subscribed may be scrambled or encrypted. The services received by the terminal are stored therein in the scrambled or encrypted form. When the user orders such services, the data necessary for descrambling or the decryption keys are delivered to the user as a response to the order or payment in addition to the schedule information and time-slicing parameters, which are needed for receiving. The user may order the unsubscribed service sets or services, or upgrade a free or already subscribed service set. The data relating to the availability of service sets or services, which may be ordered or subscribed, may be sent as part of the data burst or service announcements or via a second network.

Figure 9:
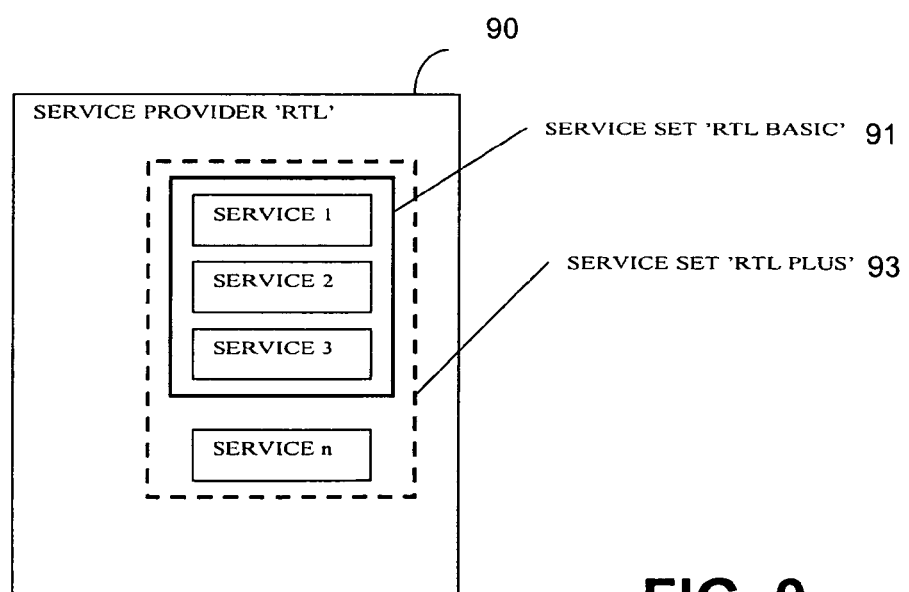
FIG. 9 is a schematic diagram that illustrates an example of the different services offered by a content provider in accordance with an embodiment.

FIG. 9 is a schematic diagram that illustrates an example of the different services offered by a content provider in accordance with an embodiment. In FIG. 9, the service provider 90 includes a combination of services or service sets (service 1-service N). If a certain service set is a combination of more than one service, the services may be shown by different designations. For example, one service set could be designated as "RTL Basic," 91 wherein the other service set may be designated as "RTL Plus" 93. By way of example, the "Basic" service may contain only one service whereas the "Plus" service may include more than one service. Additionally, the service set "Plus" and the service set "Basic" may have one or more services in common. Service sets or services, which the user has not subscribed or which are expired or not paid for, may be shown using different icons, color, text type etc. so that the user may make a distinction between them.

FIGS. 10 and 11 are tables that illustrate in more detail an example of the services available to a user via a broadcast network in accordance with an embodiment. As shown in FIGS. 10 and 11, ESG data is preferably maintained in a table format. Although it is contemplated that other data formats may be employed. Using the tables, the services available to the user can be categorized by the following: genres, subscribed/not subscribed, paid/not paid, location, free, etc. The user is presented with options for sorting the services and aggregates. For example, the options for sorting are as follows: show subscribed, show all, or show packages/bundles. It is contemplated that the "show subscribed" option will be selected most often because it will typically represent a personal set of services. When the "show all" option is selected, the subscribed services are differentiated visually from the other services.

Figure 12:
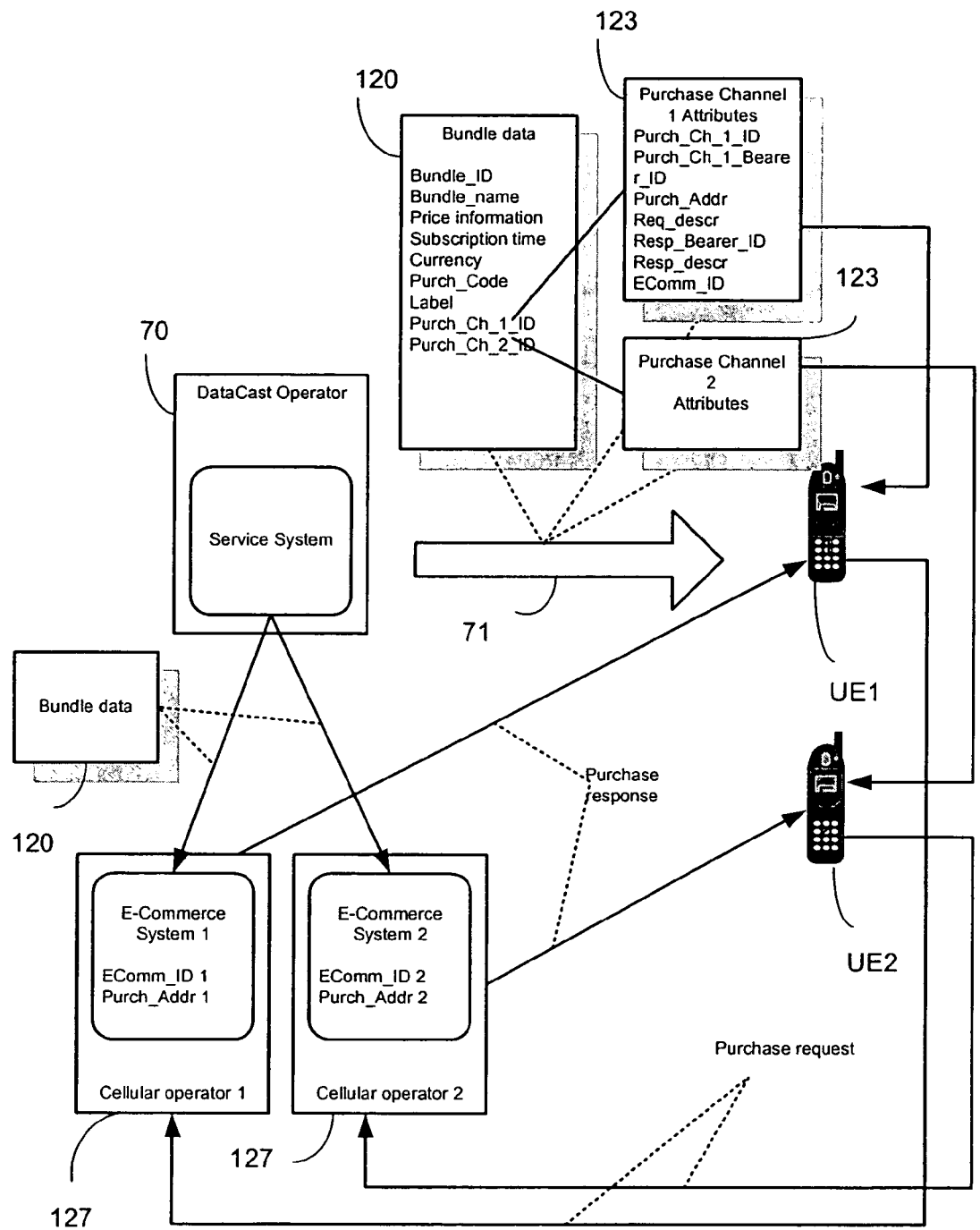
FIG. 12 is a schematic diagram illustrating in more detail an exemplary network for receiving broadcast services in accordance with an embodiment.

In tables of FIGS. 11 and 12, it is assumed that the user has selected the "subscribed" services. Once a selection is made, a query is made. The query checks all the levels of hierarchy in the ESG data. The hierarchy includes the following: ESGs, categories, channels, services, and programs. The levels of hierarchy are checked to determined their status. The status is determined by the presence of subscription/purchase vouchers. A valid voucher indicates that a service has been subscribed to or paid by the user. The subscribed services are then displayed to the user.

FIG. 12 is a schematic diagram illustrating in more detail an exemplary network for receiving broadcast services in accordance with an embodiment. In FIG. 12, the datacast operator 70 creates bundles, which comprise one or more services. The bundles are transmitted via datacast bursts 71 to the users. The bundle data 120 is associated with one or more of, but preferably all or most of, the following data items: an identifier unique to the bundle (Bundle_ID), a name describing the bundle (Bundle_name), price information (Price information) for the bundle such as e.g. a price for the whole subscription period, a price for the remaining time of the subscription period, information relating to the subscription time (Subscription time), such as e.g. subscription period start time, subscription period end time, currency (Currency), a purchase code (Purch_Code), a descriptive label (Label), and an identifier for each purchase channel (Purch_Ch_1_ID, Purch_Ch_2_ID) through which the bundle can be bought. A bundle may be purchasable through one purchase channel, or it may be available through two or more different purchase channels.

Purchase channels describe the channel through which the services or bundles can be bought. The attributes 123 describing a purchase channel include: a unique identifier for the channel (Purch_Ch_1_ID, Purch_Ch_2_ID); an identification of the bearer, e.g., Vodafone, Sonera, through which the purchase request is sent (Purch_Ch_1_Bearer_ID); a purchasing address (Purch_Addr), a description of the purchase request (Req_descr); an identification of the bearer (Resp_Bearer_ID) through which the purchase response is sent; a description of the response format (Resp_descr), e.g. device capability information (display characteristics); and an identifier unique to the e-commerce operator (Ecomm_ID).

In an embodiment, the datacast operator 70 sends bundle and purchase channel information in one or more hierarchy files. The same information 120 can also be sent to the electronic commerce systems (E-Commerce System 1, 2) 127. The electronic commerce systems 127 are accessible through one or more second networks other than the broadcast network. In one embodiment, the second network is a mobile phone network. The user may send a request for a bundle with the terminal (UE 1, UE 2) using the selected purchasing channel. The request is sent to the address that is specified in the attributes 123 of the selected purchase channel and using the bearer specified therein. The response from the e-commerce system is received through the bearer specified in the attributes 123 of the purchase channel. The purchase response may be sent as a SMS, a MMS, email or as an unconfirmed WAP Push message, any combinations of these or the like. WAP push e.g. will give the terminal the needed information (maybe invisible to user) and SMS is shown to the user. When, for example, the rights object is received by the terminal, the access to execution is possible by selection in the terminal or/and the executable content is received by the terminal.

Figure 13:
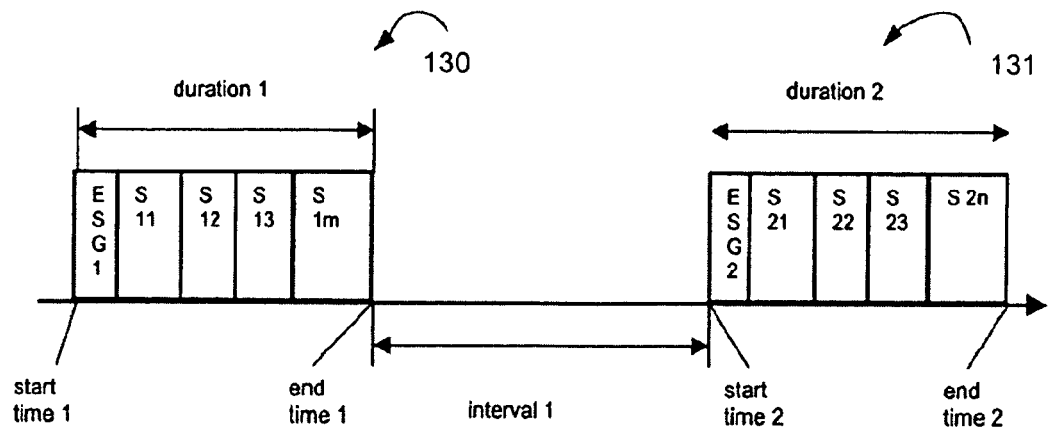
FIG. 13 is schematic diagram illustrating in more detail an exemplary method of how service components are transmitted on a channel using time-slicing in accordance with an embodiment.

FIG. 13 is schematic diagram illustrating in more detail an exemplary method of how service components are transmitted on a channel using time-slicing in accordance with an embodiment. In FIG. 13, the service components (S11, . . . , S1*m*; S21, . . . , S2*n*), relating to a particular service, may be transmitted in a burst over a DVB-T network. The first and second bursts 130, 131 have a duration ("duration 1," "duration 2"), defined by start and end times ("start time 1," "start time 2," "end time 1," and "end time 2"). The bursts 130, 131 are transmitted with an interval ("interval 1") between the end of the first burst and the start of the second burst. In this example, each burst commences with ESG data (ESG 1, ESG 2).

The content of consecutive bursts 130, 131 may be the same, or they may be at least partly different. Instead of a burst containing all service components for a set and containing service components relating only to that set, one burst may comprise any number of the service components of a service, or it may contain service components from one or more services or service sets. The order in which the service components are in the burst is determined by the multicast service system or by the multicast operator.

The ESG data or parts thereof may also be transmitted through a separate, second network, which can be unidirectional or bi-directional and may be wired or wireless. The second network would normally be a mobile phone network, such as GSM, GPRS, 3 G or UMTS, but might be a WLAN or any other communications network. The ESG data transmitted via the second network may be used by a terminal receiving the ESG.

If transmitted over DVB-T, the ESG data may be transmitted on an IP Control Channel (IP-CC). The ESG data includes metadata about the services, such as what types of services are available, how the service content can be received and how it can be consumed. That metadata is sent as a set of announcement files using IP-based protocols. The ESG data may be transmitted repeatedly, e.g., carousel-style.

Figures 14A, 14B:
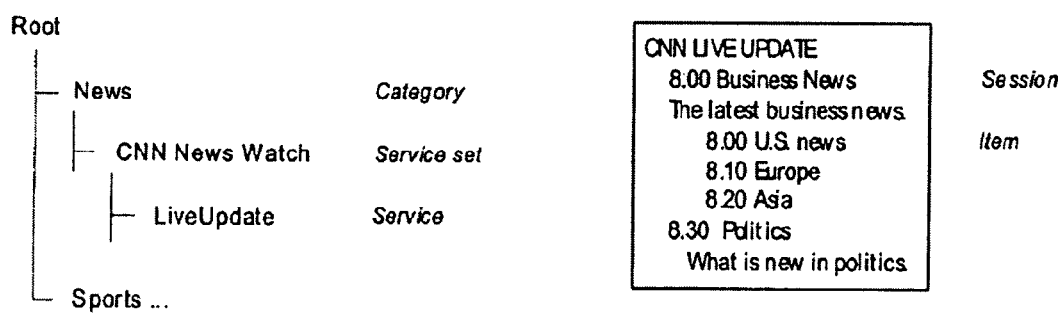
FIG. 14A is a schematic diagram of one exemplary hierarchy for service components in accordance with an embodiment.
FIG. 14B is a schematic diagram that illustrates an example of the partial content of one service in accordance with an embodiment.

In one embodiment, the available services are configured hierarchically, as illustrated in FIGS. 14*a* and 14B. FIG. 14A shows one example of the hierarchical structure of the services and FIG. 14B shows an example of a partial content of one service.

In one embodiment, at the highest level, the hierarchical structure contains categories. Services are classified with categories. There can be many levels of categories. The categories classify the service sets. Categories can include channels, for example, relating to a certain topic or content type. A channel might be one set of services that the user can identify with one name or brand, for example CNN (RTM) or BBC (RTM). Below a category in the hierarchy there can be subcategories or service sets. Service sets combine the same kind of services together, although they can instead relate to an identifiable entity, for example CNN (RTM), or BBC (RTM). A service set is owned by a Service Provider (SP) or a Content Provider (CP). One CP or SP can have many service sets. Service sets combine the same kind of services of one CP or SP together. One service can belong to many different service sets but all the services of one service set are preferably owned by the same SP or CP. A bundle is a sellable entity, i.e. a group of services that are sold together by an SP.

In FIG. 14A, a service category "News" is shown with a service set "CNN News Watch" and below that a service "Live Update." The service "News.CNNNewsWatch.LiveUpdate" may include one or more service sessions, for example a program about the latest business news, as shown in FIG. 14B. The service sessions include items, which can be for instance news related to different parts of the world. If the items also are scheduled and the schedules are shown to the user, the user can watch the news only when a part or parts of interest is being transmitted.

The hierarchy of the available services is quite static. Services and service sets can change, but changes are infrequent and no end time for the service is usually announced to the user. The ESG data contains metadata describing the level in question (i.e. whether it is a category, service set or service) and links to more detailed information. A service set can have a default service, i.e. a service which is opened as the service set is entered, and identified by the metadata. A service set may also be associated in the user interface with a button or menu behind which there is a list of included services.

Each entity has an identifier. That identifier always is unique in the scope of the identifiers (of those entities) of the multicast operator. For example, a service identifier is unique in the scope of the service identifiers of the multicast operator, and a category identifier is unique among the multicast operator's category identifiers etc. In one embodiment, all identifiers are numeric. The more dynamic part of ESG information is the program part. The program part includes service sessions, which are instances of services and which have a start time and a stop time. Service sessions comprise service items or service components. Service items are "pieces" of content that can be individually consumed. All the service items of the service session are transmitted using the same kind of transmission parameters. As with service sessions, service items can have their own start time and stop time inside the service session.

That hierarchical structure makes it possible to present a service portfolio in a logical and associative format and allows for easy ESG presentation and retrieval. That makes it easier for a user to find the services that they are interested in, and also makes it easier for the operator to schedule the sessions so that the service sessions that are deemed to be likely to interest the same people overlap as little as possible. The information included in the hierarchy files includes information relating to purchase channels, bundles, categories, service sets, services, and other similar information. In addition to the hierarchical categorization, the services may be associated with other classification and/or identification data such as the genre of the service.

Purchase channels describe the channel through which the services or bundles can be bought. The attributes describing a purchase channel include a unique identifier for the channel, an identification of the bearer through which the purchase request is sent, a purchasing address, a description of the purchase request, an identification of the bearer through which the purchase response is sent, a description of the response format and an identifier unique to the e-commerce operator.

Services can be bought in bundles. Thus, bundles are the sellable items. These bundles are associated with one or more of, but preferably all or most of, the following data items: an identifier unique to the bundle, a name describing the bundle, price information for the bundle such as, for example, a price for the whole subscription period, a price for the remaining time of the subscription period, subscription period start time, subscription period end time, currency, a purchase code, a descriptive label, and an identifier for each purchase channel through which the bundle can be bought. The descriptive label can be shown to the user to explain the use of the purchase item, and may take the form "3 months purchase," "purchase to the end of the current month," etc. A purchase code is used in an e-commerce system to identify the purchased bundle. In one embodiment, for every bundle and period combination which can be purchased, there is a purchase code. In another embodiment, there is a code for each bundle and a code for each period, allowing each bundle/period combination to be identified by a purchase code including a combination of the two codes. A bundle may be purchasable through one purchase channel, or it may be available through two or more different purchase channels. In yet another embodiment, programs, channels and sessions can be purchased individually in addition to bundles. In that case, a code needs to be provided for each of the items which is individually sellable. However, there does not necessarily need to be an end time or duration, since the items tend to have a natural end time, so the purchase codes can be simpler.

To form the category information, one or more of (preferably all or most of) the following data items is given: a name for the category, a unique identifier for the category (which in one embodiment is numeric) a short description for the category, a display order in which the network operator requires the alternatives of the category level to be shown, an indication of a parental rating, and a parent category identifier. The data item list above is meant to be exemplary. It is also contemplated that other data items can be used in addition or as replacements.

For the service set information, one or more of (preferably all or most of) the following data is given: a name for the service set, a unique identifier for the service set (which in one embodiment is numeric) a short description for the service set, a display order in which the operator requires the service sets of the category to be shown, an indication of a parental rating, a reference to main pages of the service sets, information about the services of the service set, identification data for the services that belong to the service set, a display order of the service in a service set (in which order the services are shown to the user), a default service identification, and other operator specific attributes such as, for example, author, creation date. The value of the attributes can be a string, an integer, a date, a URL or any combination of all or some of these, for example the combination of an integer and a string value. The attributes may comprise one or more of a name, a description and a unique identifier for the attribute. The service set information may also include an identifier for each bundle that the service belongs to. Again, the list above is exemplary, other data items can be used in addition or as replacements.

For each of the services one or more of (preferably all or most of) the following data is given: a name of the service, a unique identifier for the service, an indication of a genre of the service, a short description for the service, a URL where a detailed description can be found, a list of the identifiers of the bundles that the service belongs to, an indication of a parental rating of the service, a URL for the rating of the service, an indication of the type of the service, and other operator specific attributes such as for example the author and/or the creation date. The value of the attributes can be a character string, an integer, a date, a URL or any combination of some or all of these. The attributes may comprise one or more of the following: a name, a description and a unique identifier for the attribute. The genre of the service may be indicated by using the same or similar alternatives as in the '468 standard v 1.4.1. The indication of the type of the service allows the terminal to differentiate between different services, for example DVB multicast services, online services and 3 G multicast services.

The data related to a session item includes a session starting time, an end time or alternatively a duration of the session. The ESG data may additionally include carousel information, such as the type of the carousel, the IP addresses and ports of other carousels, expiration times and update intervals of the carousel information, a modification time of the hierarchy data, and references to the operator main page. The modification time is the time when the hierarchy was last modified. The operator main page is the page that the user can see first when opening the ESG. The operator main page may include the ten most popular IPDC services, a list of the newest services, a list of recommendations, etc. The main page may be available for display to the user very quickly after opening the ESG. The main page is sent in a main page carousel. The ESG data may also include a unique identifier for the ESG, and information concerning the languages of the ESG. Each supported language can have a separate ESG data file. Also announced is expiration time information, which indicates a time before which the announced information will not normally change. The expiration time can be announced for hierarchy, session and main page carousels. For session and main page carousels, the update interval (in seconds) may be given, allowing the times for the next updates to be calculated without checking the hierarchy file.

Figure 15:
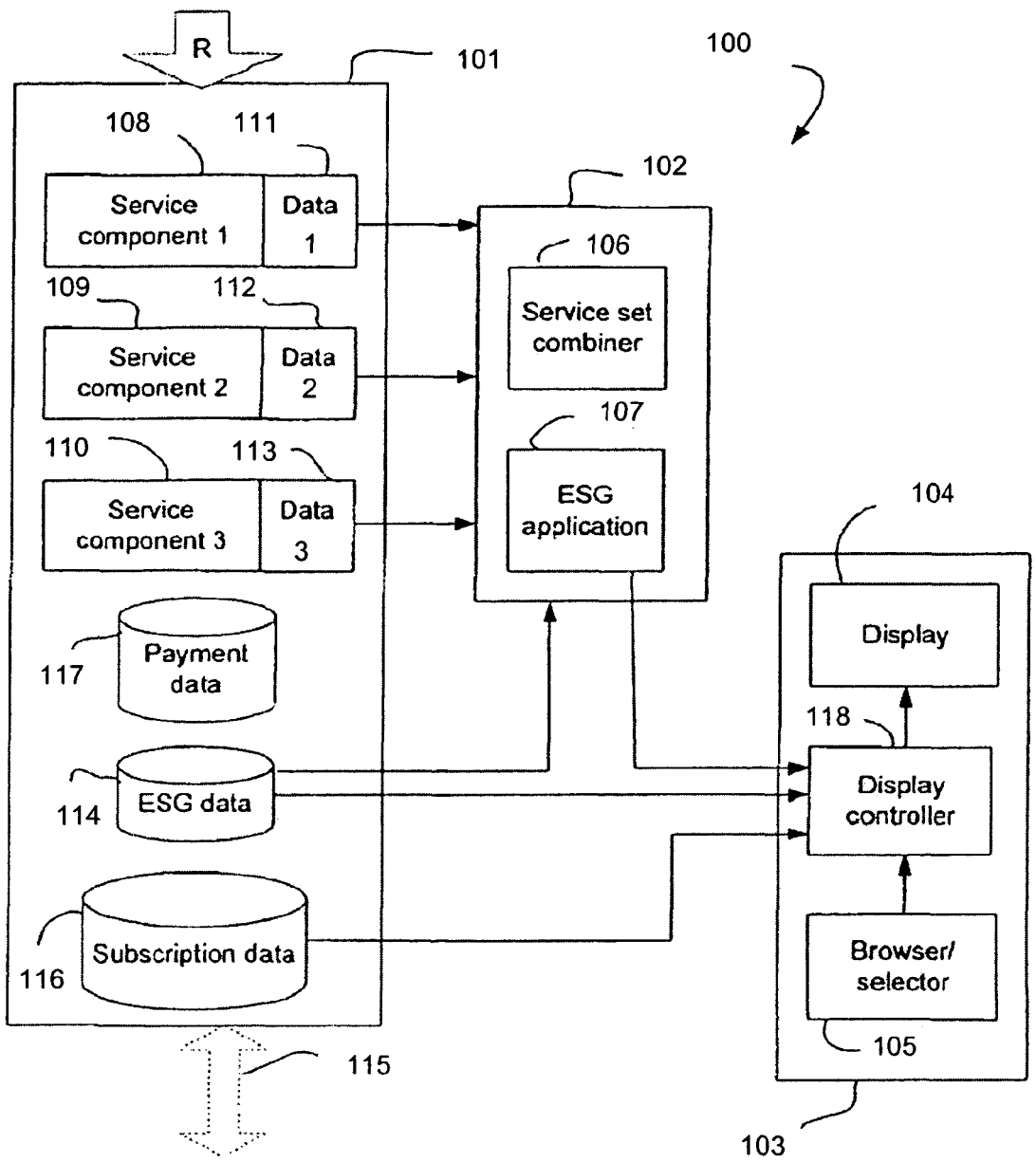
FIG. 15 is a schematic diagram illustrating exemplary hardware and software components of a mobile terminal in accordance with an embodiment.

FIG. 15 is a schematic diagram illustrating exemplary hardware and software components for a mobile terminal in accordance with an embodiment. In FIG. 15, a mobile terminal 100, only partly shown, is implemented as a DVB-T client having a DVB-T or DVB-H receiver (not shown). The mobile terminal 100 includes generally a memory 101 which is connected to a service data handler 102 and to a user interface 103. The user interface 103 includes a display 104 and a browsing selector 105, for example a keypad or a touchscreen input device, and a display controller 118. The data handler 102 is formed from a service set combiner application 106 and an ESG handling application 107. The memory 101 is configured to store N service components, three of which are illustrated at 108-110, along with the service identification data 111-113 corresponding thereto. The memory 101 also stores ESG data in an ESG data storage area 114. The memory 101 also includes a subscription database area 116 for the storage of subscription data, and a payment data area 117 in which payment data is stored. The terminal 100 is shown broken-down only for convenience. A practical implementation of the above-described components would normally utilize a ROM memory, provided with suitable software, a RAM memory, a single microprocessor and a display with a display driver. The receiver (not shown) has an air interface with the DVB-T network. The terminal 100 gets information R from the DVB-T network as IP datacasting bursts through the receiver.

The mobile terminal 100 receives and stores the IP datacasting burst including ESG data and the service components and the associated data in a memory. On the basis of the ESG data and the associated data items, the terminal 100 is able to associate the service components with the appropriate service sets. The user of the terminal 100 may, through the user interface 103, browse and select the received content for viewing or rendering. The data items describing the various service components can be used for setting up a hierarchy for categorizing the received content items. Further, the data in the service set schedule may be used for arranging the services in order according to their timing (now, next, today, next week, etc.). How the services are configured may depend on a setting or a user input, for example.

The mobile terminal 100 can extract from the received ESG data and the received service set schedule information. Additionally the terminal 100 can extract from the received Service Information (SI) and Program Specific Information (PSI) table information concerning the schedules and the carrier transmission frequency or frequencies of the service sets or service components. Following selection of a service set or service component, the terminal 100 is able to tune to the correct frequency when the desired or selected service set or service component is being transmitted. As described below, the different service sets are shown displayed in the user interface 103 of the terminal 100. The user interface 103 also includes browsing and selecting means 105.

In order to make sure that the user does not have outdated information, the information must be updated periodically. Each announcement contains an expiration time, which is an absolute time indicating when the next version is due. The new version is not necessarily different from the old version, but it is guaranteed that there will not be any changes during the validity of one version. The update interval is different for the other parts of the ESG because the probability of a change is different. The terminal 100 need only receive announcements when the currently stored announcement is just about to or has just expired.

In case of a hierarchy file update, for example, the terminal 100 receives the hierarchy file, then determines if the modification time of the hierarchy is later than the modification time of the hierarchy in its ESG database 114. If the received hierarchy is newer, it is updated to the ESG database 114. Otherwise the terminal 100 just notes the next expiration time. The terminal 100 can be informed of unexpected updates through an alert service that the ESG information should be updated. That can occur in any suitable way, for example using a notifications carousel. The terminal 100 is controllable through the user interface 103 to maintain up-to-date ESG data, or alternatively not to receive or update ESG data, so as to preserve battery charge should DVB-T services be not sufficiently important to the user at a given time.

The terminal 100 operates to store received service components and the corresponding service identification data, as well as the received ESG data, in the appropriate parts of the memory 101. The ESG data may be received over the DVB-T network, or through a mobile telephone network, as illustrated at 115. A terminal may receive only part of an ESG or schedules for an ESG, or it may receive the entire ESG, which describes all the available services and their schedules.

When the terminal 100 is turned on for the first time, the terminal does not have any ESG information. To be able to show the ESG information to the user, the terminal 100 must perform ESG discovery to receive the ESG data. The information reception can be divided into five phases which are, in summary: getting the IP address for the hierarchy file, receiving the hierarchy file, receiving the main pages, receiving the service session descriptions, and lastly retrieving the detailed information. That is illustrated in the flow chart of FIG. 16.

Figure 16:
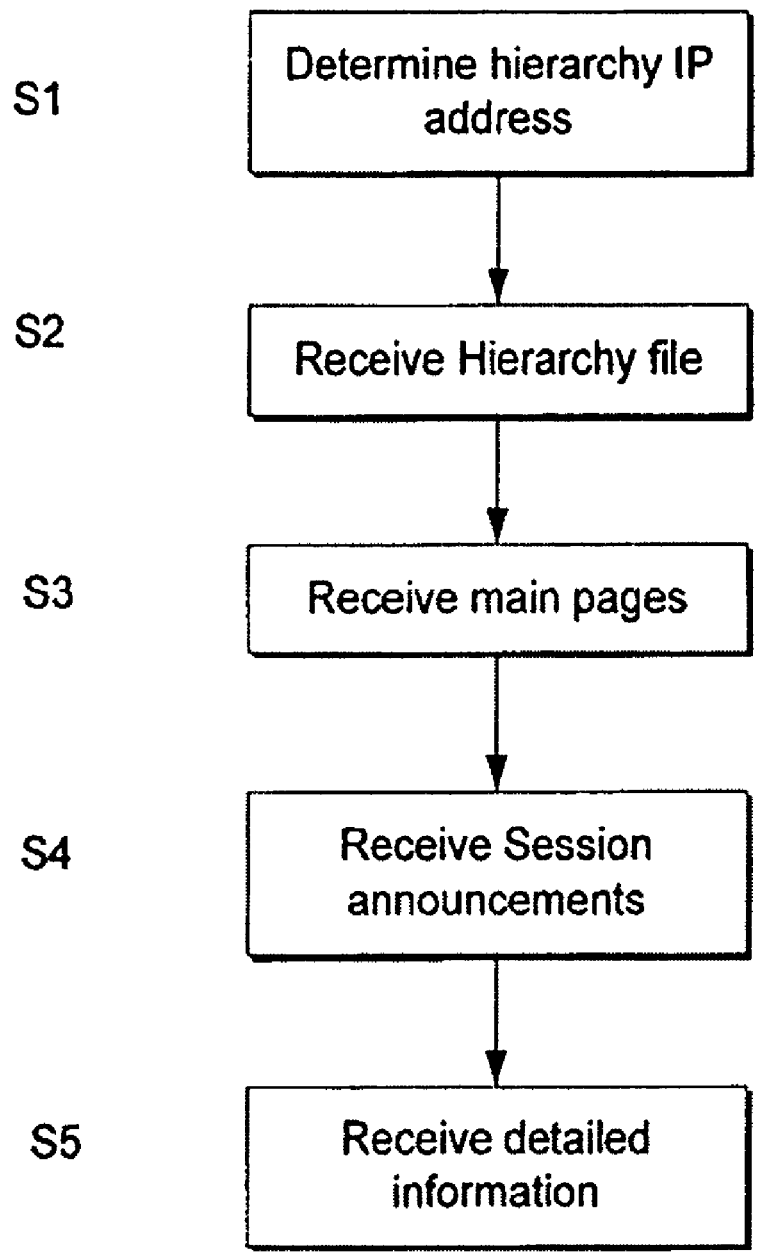
FIG. 16 is a flow diagram illustrating an example of how the terminal in FIG. 15 performs ESG discovery in accordance with an embodiment.

FIG. 16 is a flow diagram illustrating an example of how the terminal in FIG. 15 performs ESG discovery in accordance with an embodiment. At step S1, the terminal 100 must first find out the IP address for the hierarchy information. There are a number of addresses that are reserved just for the ESG information, preferably one address for each network area. The identity of the IP address for the hierarchy information file of the current cell may be obtained from the network. The mechanism for that depends on the network.

In a DVB-T network, the correct IP address for the hierarchy information file is, in one embodiment, received through the following information flow. Firstly, the receiver included in the terminal 100 scans through the available frequencies until the desired DVB-T network is found. The desired network can be the first network found, a user defined network, a network configured to the terminal, etc. Next, the receiver receives the Network Information Table (NIT). In that context, the receiver also locates the IP/MAC Notification Table (INT). That is done by interpreting all linkage descriptors of type 0x0B in the NIT table. One DVB-T link may carry several IP platforms, which can be thought of as channels. The terminal 100 inquires of the receiver which IP platforms are available, and the receiver sends the information parsed from the NIT table to the terminal. Next, the terminal 100 selects an IP platform and identifies the selected IP platform to the receiver. The receiver then receives the INT table and parses it. To get the IP address for the hierarchy file, the terminal 100 inquires of the receiver if it has a mapping for an address belonging to the ESG IP address range. The receiver then returns the IP address. It will be appreciated by the skilled person how the IP address can be obtained for other network types. When the terminal 100 has determined the correct IP address, it opens the address and starts to listen.

At step S2, the terminal receives a file containing hierarchy information and saves it to the database. The hierarchy file may be written in XML, for example. The terminal 100 may obtain from the hierarchy file among other things the IP addresses for the other carousels. That allows the terminal to move to listen to the IP address of the session announcements or the address of the main pages, which it does at step S3. The main pages are saved to the terminal 100 such that they can be shown to the user when needed. The service session information is described using, for example, SDP (Session Description Protocol) and XML files forming part of the hierarchy information. The SDP files contain the information that the terminal needs to be able to receive and consume the sessions, which occurs at step S4. The XML file is used for describing the content of sessions for the user. When the terminal 100 receives the session SDP files and the XML file, it parses them and saves the information to the database.

If after receiving the hierarchy and session announcements, more information about the services, service sessions or items is required, that can be fetched for example via a web portal. The URLs identifying these web portals are given in the announcements. The payment data storage area 117 includes data which can allow the user of the terminal 100 to subscribe to services or bundles without requiring the user to enter any information into the terminal though the user interface 103 at the time that subscription is required. The payment information can be the serial number and expiration date information of the user's credit card. Alternatively, the payment data can be a voucher, token or key that, when sent, authorizes a pre-paid account to be debited or authorizes the addition of charges to an account, such as the user's account with a mobile telephone network operator. The payment data may instead be the full legal name and address of the user, allowing the user to be invoiced by a service provider. The payment data may include the user's telephone number or e-mail address, for delivery of a voucher or receipt or other confirmation of a subscription purchase. The only requirement of the payment data is that it allows the user to pay for, or unequivocally enter into an agreement to pay for, services or bundles. It is preferred that the payment data is secured so that it cannot be accessed through the user interface 103 without the use of a password or passnumber, in case the terminal 100 is lost or stolen.

The subscription data storage area 116 includes data relating to all of the subscriptions that the user holds or has held (i.e. including expired subscriptions). The data relates also to services and bundles for which access does not require subscription. Such services can be considered as having a payment-free subscription. In that case, the subscription data identifies the bundles which have a payment-free subscription. For subscriptions which are not payment-free, the subscription data includes an identifier of the subscription provider, identifies any restrictions on the subscription, including the expiration time of the subscription, and includes any descrambling or decryption key or code which is required to access the services. A separate key or code may be required for individual services or for groups of services within the bundle, or it may apply to every service in the bundle, and the subscription data includes information which identifies the particular situation. Of course, the subscription data also identifies the bundles to which the user is or has been subscribed and can, for each bundle, identify which services form part of that bundle. Any bundle which forms part of a basic package, for example one that comes free with a user's mobile telephone or television contract, is included in that category. In that case, the expiration time of the subscription may be amended on a rolling basis, as the user pays monthly contract fees for example.

The subscription data also includes time-slicing parameters, where appropriate. The time-slicing parameters include at least the start time of the transmission of the service, and may also include the duration (or alternatively the end time) and/or the repetition interval of the IP bursts carrying the service. The repetition interval may be defined relative to the start or the end time of one IP burst and relative to the start or the end time of a successive IP burst. The time-slicing parameters may be additional to schedule information, which describes the time and day, for example, at which the services are scheduled to be broadcast. The schedule information applies only to services which are not substantially continuous. A twenty-four hour news channel can be considered a substantially continuous service, but a service relating to tennis Open Championships would have more ad-hoc transmissions.

The subscription data may be provided by a user, through the user interface 103. It is preferred though that the subscription data is received subsequent to the purchase of a subscription, for example over the mobile telephone network 115. That is particularly convenient when the subscription data includes detailed information, such as time-slicing parameters, keys or codes and schedules. The subscription data may then form part of or be received along with a voucher or receipt, which may or may not have a serial number, specific to the subscription purchase. Operation of the user interface 103 will now be described in more detail. Before presenting services, the hierarchy data is used to categorize different content types. Next, the data is sorted in an appropriate manner. The service set combiner application 106 uses the data to form service sets including only the services which are intended to form part of the respective service sets. The service set combiner 106 and the ESG application 107 together serve to construct an ESG from the ESG data. The display controller 118 takes data representing the ESG from the ESG application 107, for use in providing the ESG in a suitable format on the display 104. Since the data representing the ESG relates primarily to the structure of the ESG components, additional ESG data can be accessed by the display controller 118 by virtue of a direct connection to the ESG data area 114. The display controller 118 also takes data from the subscription data area 116 of the memory 101, and uses that subscription data when presenting the available services and bundles on the display 104.

The terminal 100 preferably is configured to allow a user to select a service accessibility display setting. If a service accessibility setting "show all" is selected by a user, then each time that the ESG is shown on the display 104, all of the available services are displayed. However, services for which the user has a valid subscription (which may be termed subscribed services) are presented differently to services for which the user does not have a subscription (which may be termed not-subscribed services). The different services may be displayed with a different color foreground, or a different color background. They may be displayed with different fonts. Subscribed services may be displayed in bold text, and non-subscribed services shown in standard text. Alternatively, subscribed services could be displayed with normal text, and non-subscribed services displayed with faint text, or greyed-out text. Services of different accessibility could otherwise be distinguished by the use of different buttons or alternatively different icons. For example, subscribed services could have displayed with them "select" buttons, whereas non-subscribed services could have "subscribe" buttons instead. Another option is to have a column (for example alongside "title" and "description" columns) which states with text whether or not the services are subscribed services.

If a service accessibility setting "show subscribed" is selected by a user, then each time that the ESG is shown on the display 104, only the subscribed services are presented on the display. Non-subscribed services are removed from the list of services in the ESG by the display controller 118. In that way, the user of the terminal 100 knows that all of the services that are displayed are accessible without requiring any subscription purchase. If a "show paid" service accessibility setting is selected, then only services that are accessible and which form part of a paid-for subscription are displayed. Services which do not require a paid subscription or which require a subscription which has not been purchased or which has expired are not presented on the display 104.

As an alternative to the service accessibility display settings, a user may be required to select an from the "show all," "show subscribed" and "show paid" options before the ESG is displayed for browsing. However, following the selection of one of the options, the resulting ESG is the same as that described above. Where it is required to display ESG data at a level different to the service level, for example at the channel or service set level, an item in the ESG is treated by the terminal 100 as though it were a subscribed service if at least one service below it in the hierarchy is a subscribed service, or as a non-subscribed service.

Subject to the service accessibility setting or input, the ESG data provided by the ESG application 107 initially is used by the display controller 118 to display the different service sets in the display 104. Alternatively, dependent on a setting or user input, the initial ESG display could list all the available bundles, allowing navigation through the bundled service packages. A further alternative might be to display schedules (configured by time of transmission), or the results of a search of the ESG, or channel guides or program guides etc. The ESG can be navigated using the browsing selector 105. An item or entity can be selected using a stylus, an "OK" key when highlighted, or using a voice command, for example, through the user interface 103.

If a selected item is not consumable, which will be the case with channels and service sets, for example, then that is taken to mean that the ESG data relating to that item and immediately below it in the hierarchy is required to be displayed. The user interface 103 also includes a "back" option (similar to those found in internet browsers), so that the user can navigate upwards in the ESG hierarchy if required. If the selected item is consumable, for example because it is a program or it is a service with only one active program in it, the service is consumed. Consumption may involve newly received data and/or data relating to the selected service which is pre-stored in the memory. Consumption may involve the use of the descrambling or decrypting key or code stored in the subscription data area 116, if the service is scrambled or encrypted. Of course, the items that are displayed are dependent on the service accessibility setting or input and on the contents of the subscription data stored in the subscription data area 116. The information about the services or programs that is presented on the display 104 can include the title, a description of the service or program, the start time, the program type (e.g. audio, audio-visual, game etc), the genre or other classification, etc. The start time may be obtained from the ESG data area 114 or from the subscription data area 116.

Figure 17:
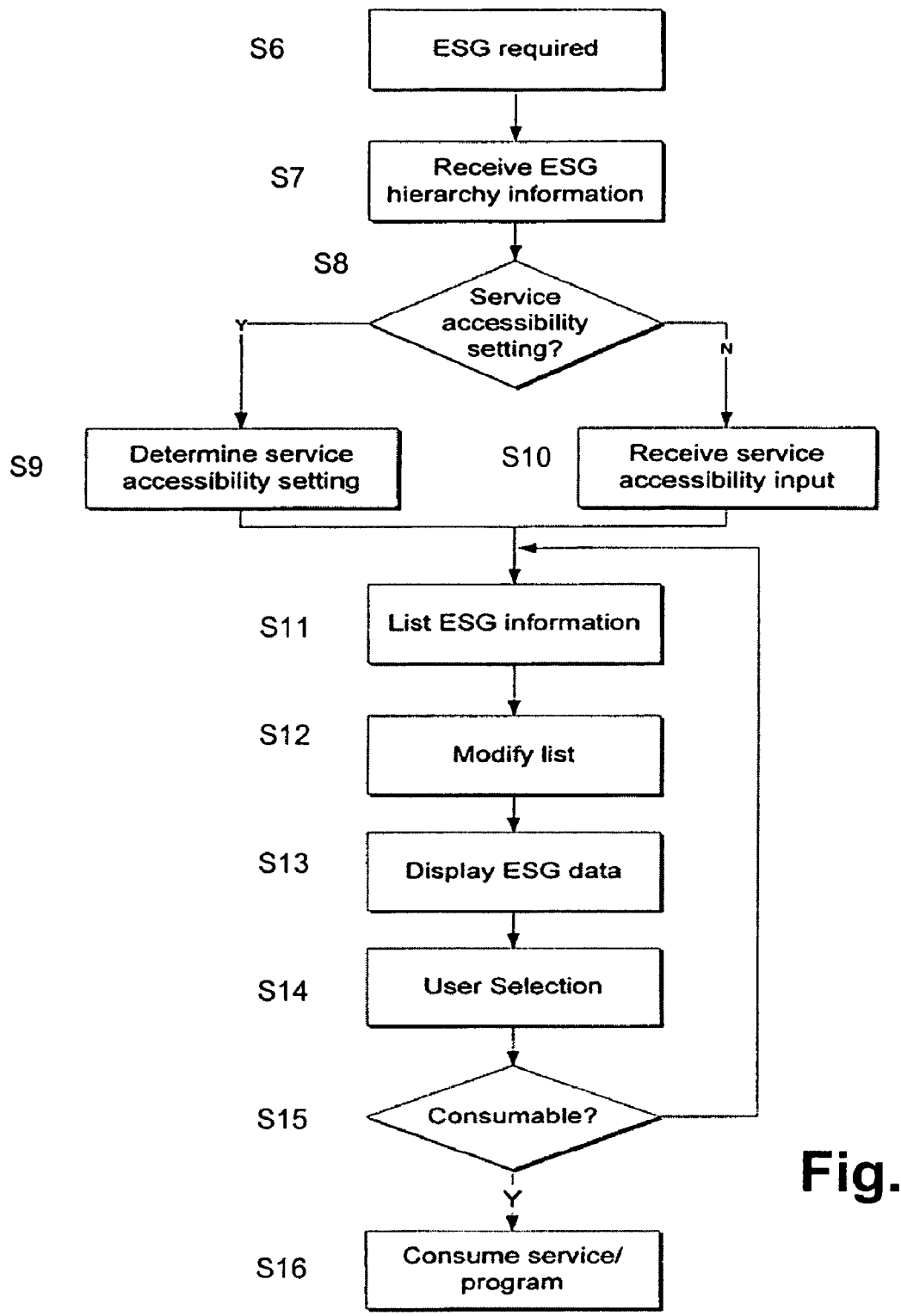
FIG. 17 is a flow diagram illustrating an example of how the terminal in FIG. 15 provides browsable ESG implemented via a user interface in accordance with an embodiment.

FIG. 17 is a flow diagram illustrating an example of how the terminal in FIG. 15 provides browsable ESG implemented via a user interface in accordance with an embodiment. At step S6, an ESG is required to be displayed on the display 104. Here, the display controller 118 requests ESG hierarchy information from the ESG application 107, which it receives at step S7. The terminal 100 then determines whether or not a service accessibility setting is present at step S8. If the setting is present, it is retrieved at step S9. Otherwise, the terminal requests a service accessibility input, which is received at step S10. Following steps S9 and S10 the display controller 118 gets the ESG information, which is relevant to the level of the ESG that is to be displayed, and puts it in a list at step S11. What is included in the list generated at step S11 depends on the settings, and might be, for example, bundles, service sets or any other suitable data.

At step S12, the list is modified according to the subscription data stored in the subscription data area 116 and according to the service accessibility setting or input. That step involves determining which of the items in the list are subscription items, or contains subscription items, as the case may be, and omitting non-subscription items or highlighting subscription items depending on the service accessibility setting or input. The items for which the subscription is expired can be shown as non-subscription items or in a way different from subscription and non-subscription items. In that way, the user can be informed on the expiration of earlier subscribed items so that the user can renew the subscription if necessary. The modified list is then displayed at S13 as ESG data. Following a user selection of one of the listed items at step S14, it is determined whether or not the selected item is consumable at step S15. If the item is consumable, it is consumed at step S16. Otherwise, it is determined that another page of ESG is required to be displayed, and the operation proceeds again to step S11. Steps S11 to S15 are then repeated in respect of the new level of ESG data. When a non-subscribed service or program is selected by a user through the user interface 103, the terminal 100 allows the user to subscribe, as will now be described with reference to FIG. 18.

Figure 18:
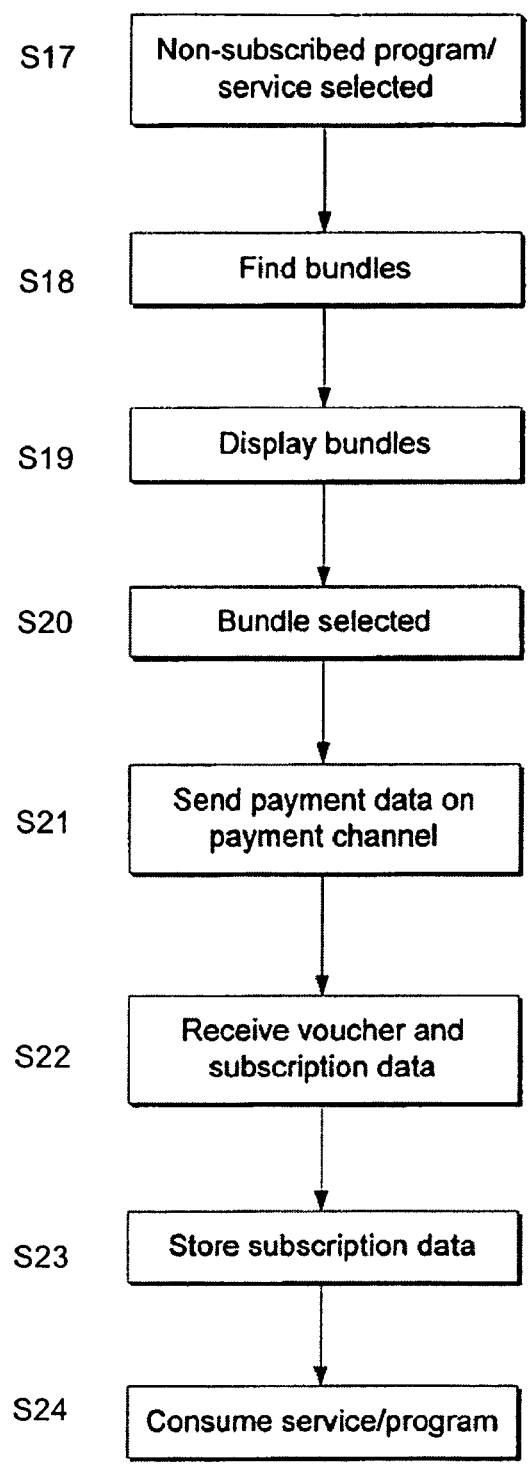
FIG. 18 is a flow diagram illustrating an example of how the mobile terminal in FIG. 15 operates when a non-subscribed service is selected by a user in accordance with an embodiment.

FIG. 18 is a flow diagram illustrating an example of how the mobile terminal in FIG. 15 operates when a non-subscribed service is selected by a user in accordance with an embodiment. Here, the procedure begins at step S17 when a non-subscribed program or service is selected. At step S18, the terminal 100 uses the ESG data stored in the ESG data area 114, or alternatively the subscription data stored in the subscription data area 116, to determine which bundles include the selected program or service. These bundles at then displayed at step S19. The bundles may be displayed with information which may be of benefit to the user, for example, the duration of the subscription and the price of the subscription, as well as details of any services which are included in that bundle. A bundle is selected by a user input at step S20. The terminal 100 then determines from the ESG data which purchase channel the bundle may be purchased. At step S21, the terminal 100 then sends payment data from the payment data area 117 using that payment channel, in order to effect purchase of the bundle. Assuming the purchase is allowed by the service provider, the terminal 100 at step S22 then receives a voucher or receipt for the subscription purchase along with subscription data relating thereto. The voucher and subscription data are then stored in the terminal at step S23, following which the program or service is consumed at step S24.

It is contemplated that the terminal 100 thus allows "one-click" subscription to a service or bundle of services. The subscription is facilitated by the inclusion in the payment data area 117 of all the data needed for a subscription purchase. The consumption of the service or program also is facilitated by the automatic storing in the subscription data area 116 of data relating to the subscription, including any de-scrambling or decryption key or code required to receive the service or program.

The step of finding the bundles which includes the non-subscribed program or service at step S18 may also involve interrogation of the subscription data stored in the subscription data area 116. In particular, it may be that the user of the terminal 100 is subscribed to a basic package which can be upgraded to a package that includes a non-subscribed program or service. Effecting upgrade in that way may be more cost effective than purchasing another bundle which includes the non-subscribed program or service.

The operation of FIG. 18 assumes that the data relating services to bundles is included in the ESG data. In another embodiment, the information relating to services bundles is provided using a mobile telephone network, for example. In that case, the terminal 100 may, following the step S17, send a request to the service provider using the mobile telephone network 115 for details of bundles, which includes the non-subscribed program or service. The requested information may be received in any suitable way, for example, by SMS or by email. If the terminal 100 does not have a direct connection to the mobile telephone network 115, connection may be made instead using a short-range wireless connection, for example a Bluetooth™ or IRDA connection, or through a wired connection to a external device which is capable of communicating through a mobile telephone network. All of that can be done without acquiring any additional user input, so its appears seamless to the user.

When the subscription data stored in the subscription data area 116 includes time-slicing parameters, the terminal 100 may use these parameters to switch on the DVB-T receiver at a time appropriate to begin receiving the service or program. That allows the DVB-T receiver only to be switched on when it is required to receive data, and remain switched off at other times. That is considered an advantageous because it can preserve battery charge.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A mobile wireless communication device, comprising:
a processor configured to cause, at least in part, reception of wireless digital multimedia broadcast data, via a first network, that identifies one or more service packages, and, in respect to one or more packages, to cause, at least in part, reception of data describing one or more channels of a second network, through which access to the one or more service packages is obtained and subscription information for one or more services in the service package is provided; and
at least one user interface screen to cause, at least in part, sending a service package request via a described channel of the second network, wherein the at least one user interface screen allows a user to subscribe to one or more unsubscribed services.

2. A method comprising:
receiving wireless digital multimedia broadcast data via a first network;
identifying one or more service packages in the wireless digital multimedia broadcast data;
receiving, via the first network, with respect to each of the one or more service packages, data describing a channel of a second network through which access to the service package is obtained and subscription information for each service in the service package is provided;
allowing a user, via at least one user interface screen, to select one or more unsubscribed services; and
causing, at least in part, sending a service package request for the one or more selected unsubscribed services using a channel of the second network through which access to a service package including the selected unsubscribed services is obtainable.

3. The method of claim 2, wherein the selecting step further comprises using received wireless digital multimedia broadcast data for each channel indicating the bearer through which a service package request is sent for that channel.

4. The method of claim 2, wherein the channel description data includes an address to which service package requests are required to be sent via a mobile wireless communication device.

5. The method of claim 2, wherein the channel description data comprises data indicating the content and/or form associated with a package access request.

6. The method of claim 2, wherein the first network includes a wireless broadcast network and the second network includes a mobile communications network.

7. A non-transitory computer-readable storage medium carrying one or more sequences of one or more instructions which, when executed by one or more processors, cause an apparatus to at least perform the following steps:
receiving wireless digital multimedia broadcast data via a first network;
identifying one or more service packages in the wireless digital multimedia broadcast data;
receiving, via the first network, with respect to each of the one or more service packages, data describing a channel of a second network through which access to the service package is obtained and subscription information for each service in the service package is provided;
allowing a user, via at least one user interface screen, to select one or more unsubscribed services; and
causing, at least in part, sending of a service package request for the one or more selected unsubscribed services via a described channel of the second network.

8. The non-transitory computer-readable storage medium of claim 7 wherein the selecting instruction further comprises using received wireless digital multimedia broadcast data for each channel indicating the bearer through which a service package request is sent for that channel.

9. The non-transitory computer-readable storage medium of claim 7, wherein the channel description data includes an address to which service package requests are required to be sent via a mobile wireless communication device.

10. An apparatus comprising:
at least one processor; and
at least one memory including computer program code,
the at least one memory and the computer program code configured to, with the at least one processor, cause the apparatus to perform at least the following:
receive wireless digital broadcast data via a first network;
identify one or more service packages from the wireless digital broadcast data, wherein each service package includes a plurality of services;
identify, in respect to each service package, data describing one or more channels of a second network through which access to the one or more service packages is obtainable;
receive subscription information for the plurality of services in the one or more service packages, the subscription information designating each of the plurality of services as a subscribed service or an unsubscribed service;
receive, via a user interface, a selection of one of the unsubscribed services; and
cause, at least in part, sending of a service package request for a selected unsubscribed service using a channel of the second network through which access to a service package including the selected unsubscribed service is obtainable.

11. The apparatus of claim 10, wherein the apparatus is a mobile wireless communication device.

12. The apparatus of claim 10, wherein the apparatus is further caused to select between two or more different channels on the basis of received broadcast data for each channel indicating a bearer through which the service package request is sent for that channel.

13. The apparatus of claim 10, wherein the channel description data includes an address to which the processor is configured to send the service package request.

14. The apparatus of claim 10, wherein the channel description data comprises data indicating the content and/or form required for a package access request, and the processor is configured to use that data to prepare the service request package.

* * * * *